(12) United States Patent
Akashi et al.

(10) Patent No.: US 8,365,597 B2
(45) Date of Patent: Feb. 5, 2013

(54) APPARATUS HAVING A MOVABLE BODY

(75) Inventors: Teruhisa Akashi, Nagoya (JP); Yutaka Nonomura, Nagoya (JP); Motohiro Fujiyoshi, Seto (JP); Hirofumi Funabashi, Nagoya (JP)

(73) Assignee: Kabushiki Kaisha Toyota Chuo Kenkyusho, Aichi (JP)

( * ) Notice: Subject to any disclaimer, the term of this patent is extended or adjusted under 35 U.S.C. 154(b) by 505 days.

(21) Appl. No.: 12/723,971

(22) Filed: Mar. 15, 2010

(65) Prior Publication Data

US 2010/0236328 A1      Sep. 23, 2010

(30) Foreign Application Priority Data

Mar. 18, 2009   (JP) ................................. 2009-066567
Mar. 1, 2010    (JP) ................................. 2010-043880

(51) Int. Cl.
*G01P 15/00*       (2006.01)
(52) U.S. Cl. .................................. 73/514.38; 73/514.32
(58) Field of Classification Search ............... 73/504.12, 73/493, 510, 514.24, 514.32, 514.38
See application file for complete search history.

(56) References Cited

U.S. PATENT DOCUMENTS

| | | | | |
|---|---|---|---|---|
| 5,565,625 | A * | 10/1996 | Howe et al. ................. | 73/514.16 |
| 5,756,901 | A * | 5/1998 | Kurle et al. ...................... | 73/777 |
| 5,780,740 | A * | 7/1998 | Lee et al. ..................... | 73/504.12 |
| 5,983,721 | A * | 11/1999 | Sulzberger et al. ......... | 73/514.32 |
| 6,122,961 | A * | 9/2000 | Geen et al. .................. | 73/504.12 |
| 6,125,701 | A * | 10/2000 | Sugitani et al. ............. | 73/504.16 |
| 6,149,190 | A * | 11/2000 | Galvin et al. .................. | 280/735 |
| 6,450,033 | B1 | 9/2002 | Ito et al. | |
| 6,481,284 | B2 * | 11/2002 | Geen et al. .................. | 73/504.12 |

(Continued)

FOREIGN PATENT DOCUMENTS

| | | |
|---|---|---|
| JP | A-2001-091265 | 4/2001 |
| JP | A-2003-194545 | 7/2003 |

(Continued)

OTHER PUBLICATIONS

U.S. Appl. No. 13/047,274, filed Mar. 14, 2011 in the name of Akashi et al.

*Primary Examiner* — Peter Macchiarolo
*Assistant Examiner* — Samir M Shah
(74) *Attorney, Agent, or Firm* — Oliff & Berridge, PLC

(57) ABSTRACT

An apparatus with a second movable portion that moves along an x-axis direction and a z-axis direction and a first movable portion that only moves along the z-axis direction is disclosed. The apparatus is provided with a fixed portion fixed to a support portion, a plurality of first spring portions connected to the fixed portion, a first movable portion connected to the plurality of first spring portions, a second spring portion connected to the first movable portion, and a second movable portion connected to the second spring portion. A spring constant of each of the plurality of first spring portions in the z-axis direction is lower than spring constants of each of the plurality of first spring portions in the x-axis and a y-axis directions respectively, and a spring constant of the second spring portion in the x-axis direction is lower than spring constants of the second spring portion in the y-axis and the z-axis directions respectively. The first movable portion is configured to move along the z-axis but not to move along the x-axis and the y-axis nor to rotate around the z-axis, and the second movable portion is configured to move along the x-axis and the z-axis with respect to the support portion.

15 Claims, 19 Drawing Sheets

U.S. PATENT DOCUMENTS

| | | | |
|---|---|---|---|
| 6,487,908 B2 * | 12/2002 | Geen et al. | 73/504.12 |
| 6,508,124 B1 * | 1/2003 | Zerbini et al. | 73/514.32 |
| 6,546,801 B2 * | 4/2003 | Orsier et al. | 73/514.38 |
| 6,755,289 B2 * | 6/2004 | Weiss | 192/18 A |
| 6,786,313 B2 * | 9/2004 | Weiss et al. | 192/18 A |
| 6,925,877 B2 * | 8/2005 | Geen et al. | 73/504.12 |
| 6,964,195 B2 * | 11/2005 | Hobbs et al. | 73/504.14 |
| 7,322,242 B2 * | 1/2008 | Merassi et al. | 73/514.38 |
| 7,406,866 B2 * | 8/2008 | Geen et al. | 73/504.12 |
| 7,501,835 B2 | 3/2009 | Fujiyoshi et al. | |
| 7,637,155 B2 * | 12/2009 | Delevoye | 73/504.12 |
| 7,723,901 B2 * | 5/2010 | Inaguma et al. | 310/330 |
| 7,849,742 B2 * | 12/2010 | Wang et al. | 73/514.32 |
| 8,183,650 B2 * | 5/2012 | Wang et al. | 257/415 |
| 8,186,220 B2 * | 5/2012 | Geisberger et al. | 73/514.32 |
| 2003/0056589 A1 * | 3/2003 | Geen et al. | 73/504.14 |
| 2003/0110858 A1 | 6/2003 | Kim et al. | |
| 2003/0146064 A1 * | 8/2003 | Weiss et al. | 192/85 CA |
| 2003/0183007 A1 | 10/2003 | Willig et al. | |
| 2005/0166675 A1 * | 8/2005 | Hobbs et al. | 73/504.12 |
| 2005/0274182 A1 * | 12/2005 | Geen et al. | 73/504.12 |
| 2009/0090184 A1 * | 4/2009 | Wang et al. | 73/514.24 |

FOREIGN PATENT DOCUMENTS

| | | |
|---|---|---|
| JP | A-2007-333467 | 12/2007 |
| WO | WO 99/12002 A2 | 3/1999 |
| WO | WO 02/066927 A1 | 8/2002 |

* cited by examiner

APPARATUS HAVING A MOVABLE BODY

CROSS-REFERENCE TO RELATED APPLICATIONS

This application claims priority under Paris convention based on (1) Japanese Patent Application No. 2009-066567 filed on Mar. 18, 2009 and (2) Japanese Patent Application No. 2010-43880 filed on Mar. 1, 2010, the contents of which are hereby incorporated by reference into this application.

TECHNICAL FIELD

The teachings disclosed herein relate to an apparatus having a movable body that can move in two directions. The present teachings may relate e.g., to an apparatus comprising a movable body that is moved along an x-axis when subjected to acceleration in an x-axis direction, and that is moved along a z-axis when subjected to acceleration in a z-axis direction. The present teachings may relate alternatively to an apparatus having a movable body that is moved along the z-axis when the movable body is subjected to angular rate about a y-axis while oscillating in the x-axis direction. The present teachings may relate to an apparatus comprising a movable body that can move in two axial directions (the movable body having two degrees of freedom, which may be termed a 2-DOF movable body). The present teachings are not limited to an apparatus in which the 2-DOF movable body is moved through an exertion of an external force. The 2-DOF movable body may also be caused to move autonomically by an actuator built into the apparatus. The apparatus disclosed herein may be an instance of a micromechanical structure (MEMS) that can be suitably manufactured using semiconductor processing technologies.

DESCRIPTION OF RELATED ART

Conventional apparatuses have been proposed in which a physical magnitude is detected by detecting a displacement of a 2-DOF movable body (e.g., an x-z movable body). Some proposed apparatuses detect acceleration along an x-axis on the basis of a displacement along the x-axis, and detect acceleration along a z-axis on the basis of a displacement along the z-axis. Other proposed apparatuses detect angular rate about a y-axis on the basis of the displacement along the z-axis.

In an apparatus comprising the x-z movable body, the displacement along the x-axis influences the detection of the displacement along the z-axis, while the displacement along the z-axis influences the detection of the displacement along the x-axis. It is therefore difficult to independently detect the respective displacement in the x-axis direction and the z-axis direction.

Japanese Patent Application Publication No. 2003-194545 proposes an angular rate sensor which attempts to solve the above problem. This angular rate sensor has a first mass and a second mass. The second mass can be moved along the x-axis and the z-axis. When acted upon by an angular rate about the y-axis while oscillating in the x-axis direction, the second mass experiences a Coriolis force acting in the z-axis direction, whereupon the second mass is moved along the z-axis. The first mass is guided in such a manner that it can move along the z-axis, but not along the x-axis. The first mass and the second mass are connected by a spring. The spring is flexible in the x-axis direction but stiff in the z-axis direction. The first mass and the second mass can be moved relative to each other in the x-axis direction, but are moved integrally along the z-axis. When the second mass, which is oscillating in the x-axis direction, is moved along the z-axis through the exertion of the Coriolis force, the first mass is not moved along the x-axis, but only along the z-axis. The displacement of the first mass along the z-axis is equal to the displacement of the second mass along the z-axis. The angular rate about the y-axis can be detected on the basis of the displacement of the first mass along the z-axis. In the above sensor, the first mass that detects the displacement along the z-axis is not moved along the x-axis. As a result, this allows detecting accurately the displacements of the first mass and the second mass along the z-axis, and detecting accurately the angular rate about the y-axis. Similar technologies are set forth in, for instance, WO 02/066927, Japanese Patent Application Publication No. 2007-333467, and WO 99/12002.

SUMMARY

Conventional technologies do not address the rotation of the first mass. The first mass, which can be moved along the z-axis, may rotate about the z-axis in some cases. This gives rise to a mismatch between the displacement of the first mass in the z-axis direction and the displacement of the second mass in the z-axis direction, which in turn translates into poorer detection precision.

The teachings disclosed herein were conceived in order to solve the above problem. The present teachings aim at preventing displacement along the x-axis from influencing the detection of the displacement along the z-axis, by providing, in addition to the 2-DOF movable body (e.g., the x-z movable body), a 1-DOF movable body that is moved together with the 2-DOF along the z-axis but is not moved in the x-axis direction. According to the teachings disclosed herein, rotation of the 1-DOF movable body may also be prevented, and greater detection precision may be achieved as a result.

An apparatus according to one preferred embodiment of the disclosure in this specification has a movable body. The apparatus comprises a first layer comprising a support portion; a second layer partially stacked on the first layer; and a third layer stacked on the first layer via the second layer. The third layer extends along an x-axis and a y-axis that are perpendicular to each other. A z-axis is perpendicular to the x-axis and y-axis respectively. The third layer comprises a fixed portion fixed to the support portion via the second layer, and a separate portion separated from the support portion. The separate portion comprises a plurality of first spring portions connected to the fixed portion, a first movable portion connected to the plurality of first spring portions, a second spring portion connected to the first movable portion, and a second movable portion connected to the second spring portion. The second movable portion comprises a rectangular frame having two sides extending along the x-axis and two sides extending along the y-axis. The first movable portion is enclosed within the rectangular frame. The plurality of first spring portions is distributed at least at four positions between the first movable portion and the second movable portion. The four positions are distributed at four symmetric positions about the x-axis and the y-axis that pass through a center of the first movable portion. A spring constant of each of the plurality of first spring portions in a z-axis direction is lower than spring constants of each of the plurality of first spring portions in an x-axis and a y-axis directions respectively. A spring constant of the second spring portion in the x-axis direction is lower than spring constants of the second spring portion in the y-axis and the z-axis directions respectively. The first movable portion is configured, by the plurality of first spring portions, to move along the z-axis but not to move along the x-axis and the y-axis nor to rotate around the z-axis with respect to the support portion. The second movable portion is configured, by the plurality of first spring portions and the second spring portion, to move along the x-axis and the z-axis with respect to the support portion.

In the above apparatus, the first spring portions are provided at least at four positions that are symmetrical with respect to the x, y-axes that run through the center of the first movable portion within the x-y plane. Consequently, the first spring portions provided at least at those four positions surrounding the first movable portions significantly suppress the rotation of the first movable portion, even when a force is exerted on the first movable portion which would cause the first movable portion to rotate about the center thereof within the x-y plane. The first spring portions are flexible in the z-axis direction but stiff in the x-axis and the y-axis directions. As a result, the first movable portion can be prevented from rotating about the z-axis even when it is supported only on one first spring portion. The rotation of the first movable portion can be suppressed very strongly when the first movable portion is supported at least at four positions that are symmetrical with respect to the x, y-axes that run through the center of the first movable portion by the first spring portions which are flexible in the z-axis direction but stiff in the x-axis direction.

Influence of any permanent strain that may arise in the plurality of first spring portions during manufacture is countered by having the first movable portion be supported by first spring portions that are provided at least at four positions surrounding the first movable portion, thereby cancelling the influence of the permanent strain. Undesired rotation of the first movable portion can be thus strongly suppressed. The above problem is particularly serious in the manufacture of devices that use materials which requires high temperatures in forming a film, such as polysilicon and SiGe. Thermal stress is substantial in such cases, and hence warpage is likely to occur. Depending on the apparatus, warpage (which is an example of the permanent strain) during manufacture can give rise to problems such as variability in offset values, and/or detection value shifts on account of temperature changes.

The above characteristics of the teachings disclosed herein can be exploited in various applications such as sensors in which measurement of acceleration in a predetermined direction is free of interference from acceleration in another direction, or in actuators that allow realizing accurate translational displacements in a predetermined direction. As a result of analysis and experimentation, the inventors of the present application have found that the above characteristics afford excellent resistance towards oscillatory disturbances, as well as excellent resistance to shocks. The resistance to oscillatory disturbances is a useful property when the present apparatus is installed in movable bodies such as automobiles. The resistance to shocks is a useful property for accident sensing in movable bodies such as automobiles.

BRIEF DESCRIPTION OF DRAWINGS

FIG. 8 is a plan-view diagram of an angular rate sensor 10a of a second embodiment comprising a movable body 100a;

DETAILED DESCRIPTION OF PREFERRED EMBODIMENTS

Figure 1:
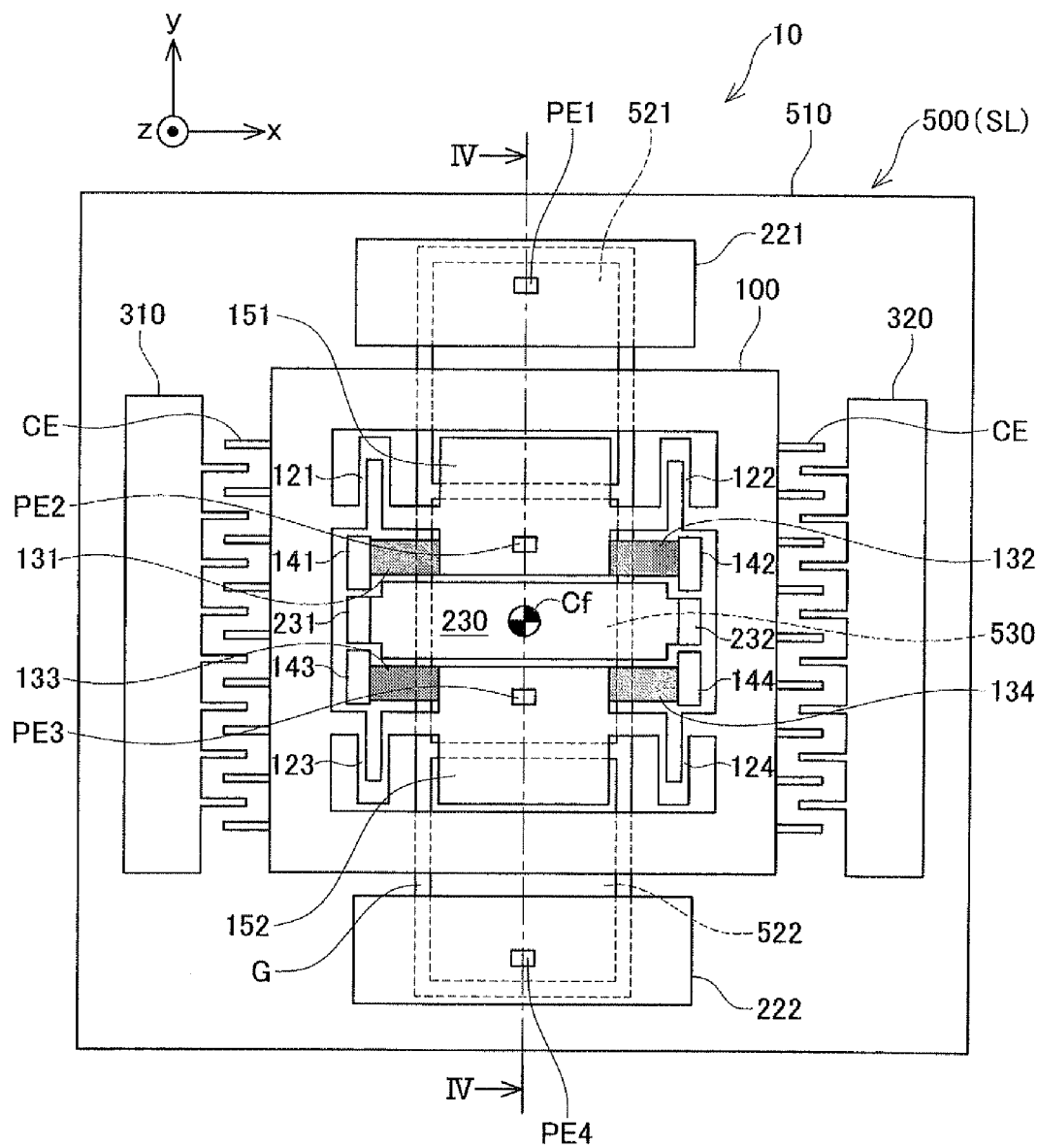
FIG. 1 is a schematic plan-view diagram of an angular rate sensor 10 of a first embodiment comprising a movable body 100.

The teachings disclosed herein may be realized in below described preferred embodiments. The preferred embodiments below may comprise characterizing features as briefly explained below, singly or in combination. One preferred embodiment of an apparatus having a movable body comprises a first layer comprising a support portion; a second layer partially stacked on the first layer; and a third layer stacked on the first layer via the second layer. The third layer extends along an x-axis and a y-axis that are perpendicular to each other. A z-axis is perpendicular to the x-axis and y-axis respectively. The third layer comprises a fixed portion fixed to the support portion via the second layer, and a separate portion separated from the support portion. The separate portion comprises a plurality of first spring portions connected to the fixed portion, a first movable portion connected to the plurality of first spring portions, a second spring portion connected to the first movable portion, and a second movable portion connected to the second spring portion. The second movable portion comprises a rectangular frame having two sides extending along the x-axis and two sides extending along the y-axis. The first movable portion is enclosed within the rectangular frame. The plurality of first spring portions is distributed at least at four positions between the first movable portion and the second movable portion. The four positions are distributed at four symmetric positions about the x-axis and the y-axis that pass through a center of the first movable portion. A spring constant of each of the plurality of first spring portions in a z-axis direction is lower than spring constants of each of the plurality of first spring portions in an x-axis and a y-axis directions respectively. A spring constant of the second spring portion in the x-axis direction is lower than spring constants of the second spring portion in the y-axis and the z-axis directions respectively. The first movable portion is configured, by the plurality of first spring portions, to move along the z-axis but not to move along the x-axis and the y-axis nor to rotate around the z-axis with respect to the support portion. The second movable portion is configured, by the plurality of first spring portions and the second spring portion, to move along the x-axis and the z-axis but not to move along the y-axis with respect to the support portion.

The apparatus may comprise a plurality of fixed portions distributed at four positions that are symmetric about the x-axis and the y-axis that pass through the center. The plurality of first spring portions may be arranged at the four positions, and the plurality of first spring portions may comprise a first group extending along the x-axis and a second group extending along the y-axis. First spring portions that are stiff in the x-axis and y-axis directions but flexible in the z-axis direction are easily realized thereby. This allows securing high rotational stiffness.

The apparatus may comprise an oscillator that reciprocates the second movable portion along the x-axis; and a displacement detector that changes its output depending on a displacement of the first movable portion along the z-axis. The displacement detector can be configured e.g., using a capacitor whose capacity changes in accordance with the displacement of the first movable portion along the z-axis.

In a state where the oscillator is reciprocating the second movable portion along the x-axis, a Coriolis force causes the second movable portion to be moved along the z-axis when angular rate about the y-axis acts on the above apparatus. As a result, the first movable portion is moved also along the z-axis. The displacement along the z-axis can be accurately detected, since the first movable portion does not move in the x-axis direction nor does it rotate. It becomes thus possible to measure angular rate with high precision and low noise.

The first layer may be divided into an inside portion and an outside portion by a groove penetrating the first layer. The inside portion is configured to move with respect to the outside portion. The outside portion may form the support portion. The fixed portion may be fixed to the outside portion via the second layer, and the first movable portion may be fixed to the inside portion via the second layer. The above structure allows increasing the mass of the first movable portion. Further, the above structure makes it easier to arrange the displacement detector of the first movable portion.

In a case that the first movable portion is fixed to the inside portion, the third layer may further comprise a detection portion extending from a portion fixed to the outside portion to a portion facing the inside portion via a gap. In the above structure, a capacitor is composed by the inside portion fixed to the first movable portion and the detection portion formed on the third layer. The inside portion fixed to the first movable portion can be moved along the z-axis relative to the outside portion, and can move along the z-axis together with the first movable portion. In consequence, an inter-electrode distance of the capacitor varies when the first movable portion is moved along the z-axis. As a result thereof, the capacity of the capacitor varies. A magnitude of the movement of the first movable portion along the z-axis can be detected on the basis of the capacity of the capacitor.

The third layer may further comprise a third spring portion connected to the second movable portion, and a second fixed portion connected to the third spring portion and fixed to the support portion via the second layer. Each of spring constants of the third spring portion in the x-axis and the z-axis directions may be lower than a spring constant of the third spring portion in the y-axis direction. The apparatus may comprise a plurality of third spring portions distributed at four positions that are symmetric about the x-axis and the y-axis that pass through the center.

The second movable portion is also supported by the third spring portion. The third spring portion, by contrast, is flexible in the x-axis and the z-axis directions, and hence the second movable portion can move freely in along the z-axis and the x-axis. The third spring portion is stiff in the y-axis direction. Thus, the second movable portion cannot move along the y-axis. This suppresses rotation of the frame-shaped second movable portion. The rotation of the second movable portion can be reliably prevented as a result.

The third spring portion may comprise a movable side spring portion connected to the second movable portion and a fixed side spring portion connected to the second fixed portion. A spring constant of the movable side spring portion in the z-axis direction may be lower than spring constants of the movable side spring portion in the x-axis and the y-axis directions respectively. A spring constant of the fixed side spring portion in the x-axis direction may be lower than spring constants of the fixed side spring portion in the y-axis and the z-axis directions respectively.

In the above structure, the third spring portion comprises the movable side portion and the fixed side spring portion. Therefore, the spring constants of the third spring portion in the x-axis and the z-axis directions are lower than the spring constant in the y-axis direction.

It is also preferred that a third movable portion is arranged between the movable side spring portion and the fixed side spring portion. In this case, the third movable portion is connected to the second fixed portion by way of the fixed side spring portion, and hence the third movable portion can move only along the x-axis, while displacement of the third movable portion in the z-axis and y-axis directions is restricted. The apparatus may comprise a pair of third movable portions that is arranged at symmetric position about the y-axis that passes through the center of the first movable portion.

In a case that the third movable portion is arranged between the movable side spring portion and the fixed side spring portion, the apparatus may further comprise an oscillator that reciprocates the third movable portion along the x-axis; and a displacement detector that changes its output depending on the displacement of the first movable portion along the z-axis.

The above apparatus detects angular rate about the y-axis. In the apparatus, the third movable portion moves reciprocally along the x-axis in order to cause the second movable portion to move reciprocally along the x-axis. The third movable portion does not move along the z-axis. Therefore, it becomes possible to simplify the configuration of the oscillator for causing the third movable portion to move reciprocally along the x-axis. The displacement detector changes its output depending on the displacement of the first movable portion along the z-axis. The first movable portion is not moved along the x-axis. Therefore, displacement along the x-axis does not hinder the detection of the displacement of the first movable portion along the z-axis. In the apparatus, the third movable portion, which is supported with high stiffness with respect to displacements other than that along the x-axis, is thus caused to move reciprocally along the x-axis. Angular rate can be measured on the basis of displacement along the z-axis by the first movable portion, which is supported with high stiffness with respect to displacements other than that along the z-axis. It becomes thus possible to measure the angular rate with high precision and low noise.

In a case that the third movable portion is arranged between the movable side spring portion and the fixed side spring portion, the apparatus may further comprise a first displacement detector that changes its output depending on the displacement of the first movable portion along the z-axis, and a second displacement detector that changes its output depending on a displacement of the third movable portion along the x-axis.

In the above apparatus, the z-axis acceleration can be measured by way of the first displacement detector, while the x-axis acceleration can be detected by way of the second displacement detector. The first displacement detector is unaffected by the accelerations in the x-axis and y-axis directions, and hence can detect the acceleration in the z-axis direction with high precision. The second displacement detector is unaffected by the accelerations in the z-axis and the y-axis directions, and hence can detect the acceleration in the x-axis direction with high precision.

The above explanation deals with an instance in which the first movable portion is moved only along the z-axis, and the second movable portion is moved only along the x-axis and z-axis directions.

Alternatively, the first movable portion may be moved only along the x-axis, and the second movable portion only along the x-axis and z-axis. In the latter case, first spring portions and a second spring portion having the below features are used. The first spring portions have spring constant in the x-axis direction that is lower than the spring constant in the y-axis direction and the spring constant in the z-axis direction respectively, and the second spring portion has spring constant in the z-axis direction that is lower than the spring constant in the x-axis direction and the spring constant in the y-axis direction.

Furthermore, the teachings disclosed herein can be realized, for instance, as preferred embodiments having the below-described characterizing features, singly or in combination.

(Characterizing feature 1) A plurality of second spring portions is connected to a joining portion (embodiment of the first movable portion or a 1-DOF movable body) at least at four positions that are symmetrical with respect to the x, y-axes that run through the center of the joining portion in the x-y plane.

(Characterizing feature 2) The first spring portions are thin in the z-axis direction, and are made up of plate springs having a greater size in the x-y plane than in the z-axis direction. Therefore, the first spring portions have high rotational stiffness within the x-y plane.

(Characterizing feature 3) The first spring portions are arranged at positions further away than that of the second spring portion, as viewed from the center of the x-y plane of the joining portion.

(Characterizing feature 4) The movable body comprises a SOI substrate.

Figure 2:
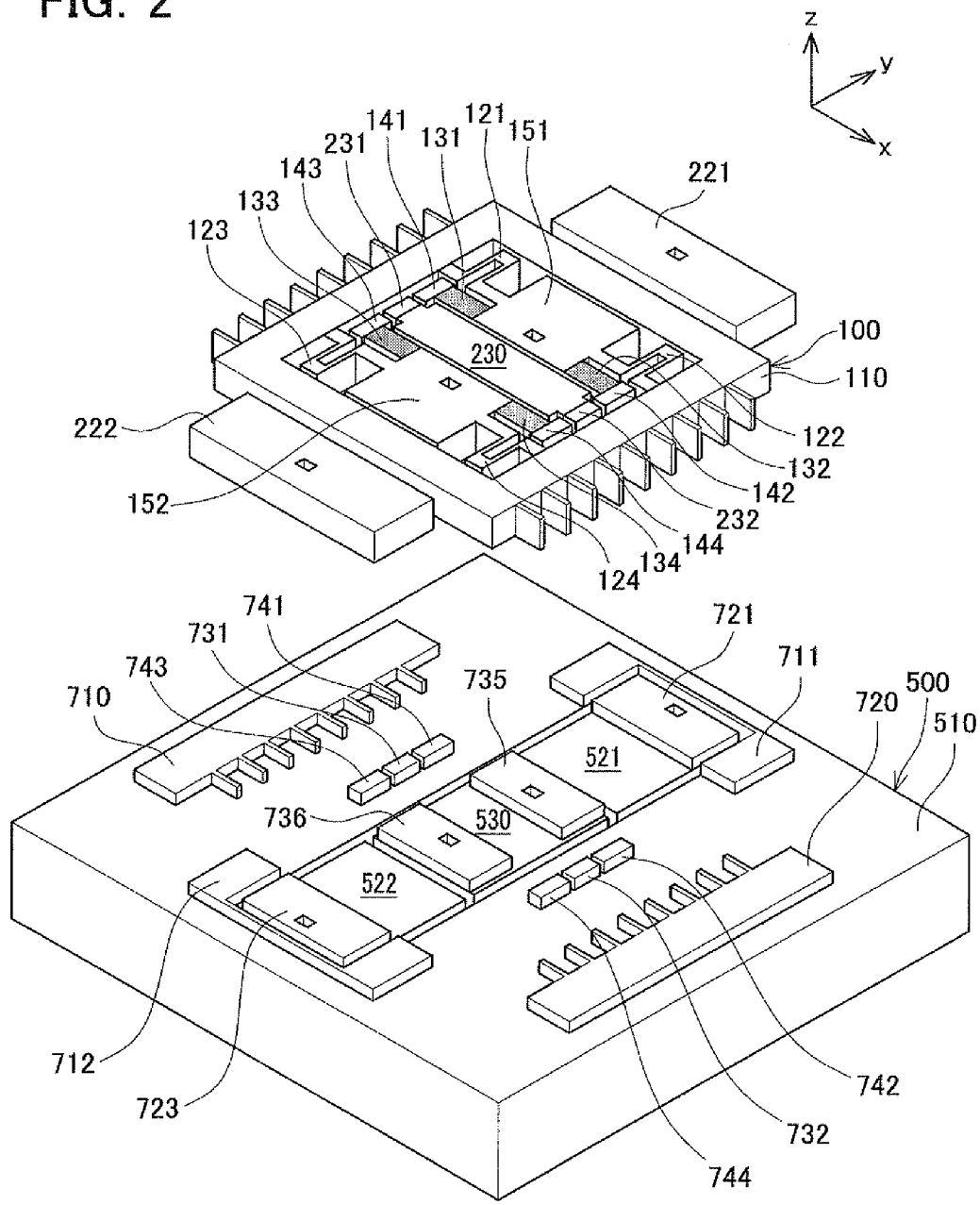
FIG. 2 illustrates schematically an exploded perspective-view diagram of the angular rate sensor 10, with the movable body 100 removed from a support substrate 500.

A. Configuration of an Angular Rate Sensor According to a First Embodiment:

The configuration of the angular rate sensor according to the first embodiment will be described with reference to FIGS. 1-7. An angular rate sensor 10 comprises a movable body 100, three fixed electrodes 221, 222, 230, a pair of excitation electrodes 310, 320, and a support substrate 500 that supports the foregoing via a buried oxide film BL. The angular rate sensor 10 is composed with an SOI (Silicon on Insulator) substrate. The SOI substrate has a stacked structure comprising a conductive active layer WL (an example of the third layer) and the support substrate SL (an example of the first layer) with the buried oxide film BL (an example of the second layer) interposed therebetween. The movable body 100, the three fixed electrodes 221, 222, 230 and the pair of excitation electrodes 310, 320 are formed on the active layer WL, as illustrated in FIGS. 1 and 2. The active layer WL and the support substrate SL are electrically connected by way of four penetrating electrodes PE1 to PE4.

Figure 3:
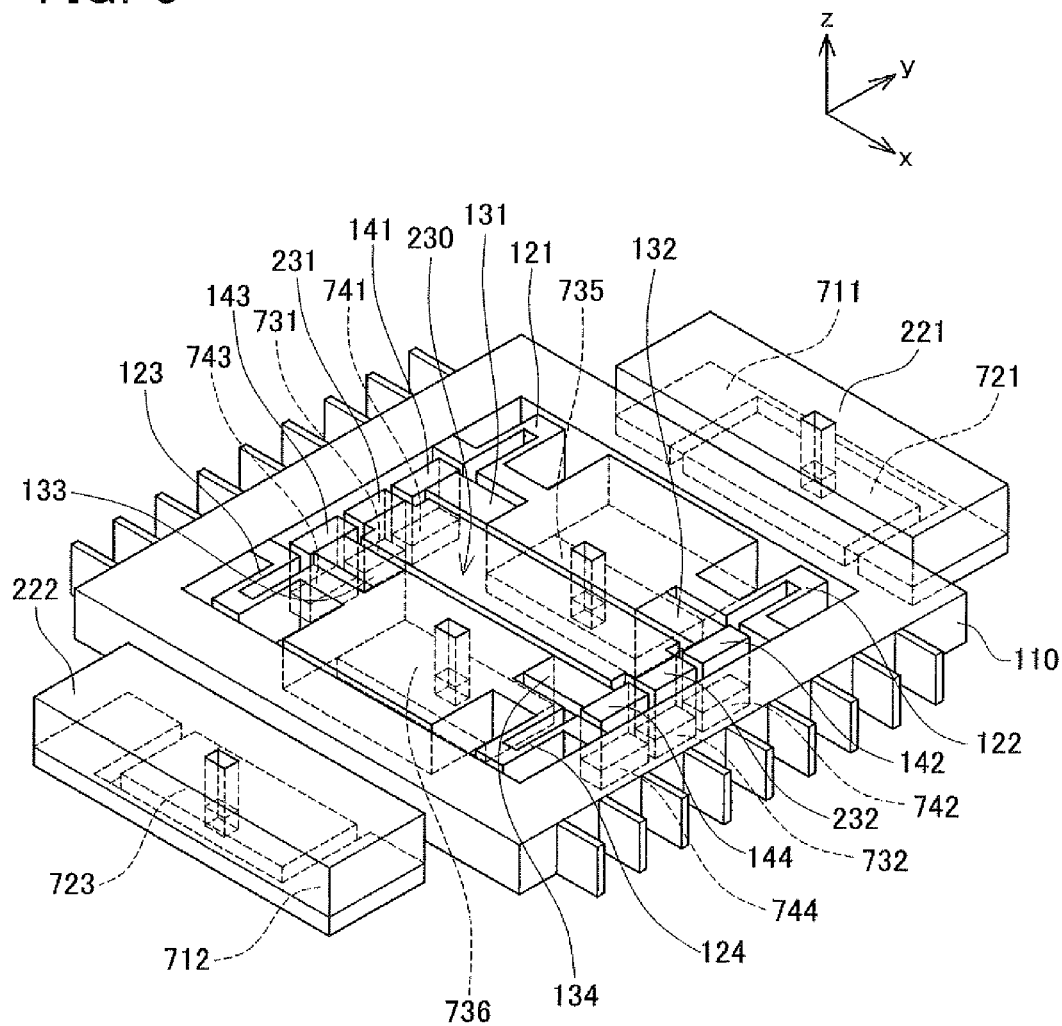
FIG. 3 illustrates a fixed state of the movable body 100 and two fixed electrodes 221, 222.
Figure 4:
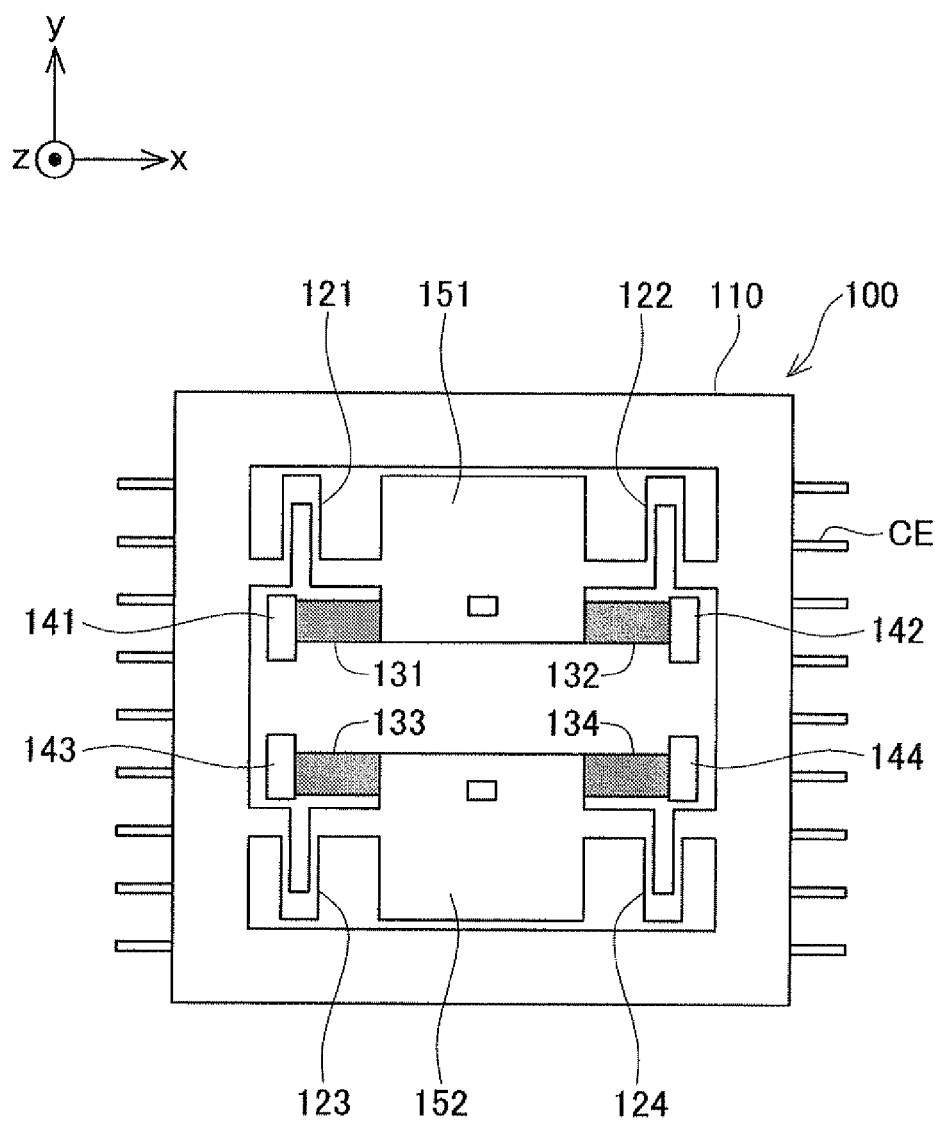
FIG. 4 illustrates a plan-view diagram of the movable body 100 of the first embodiment.
Figure 5:
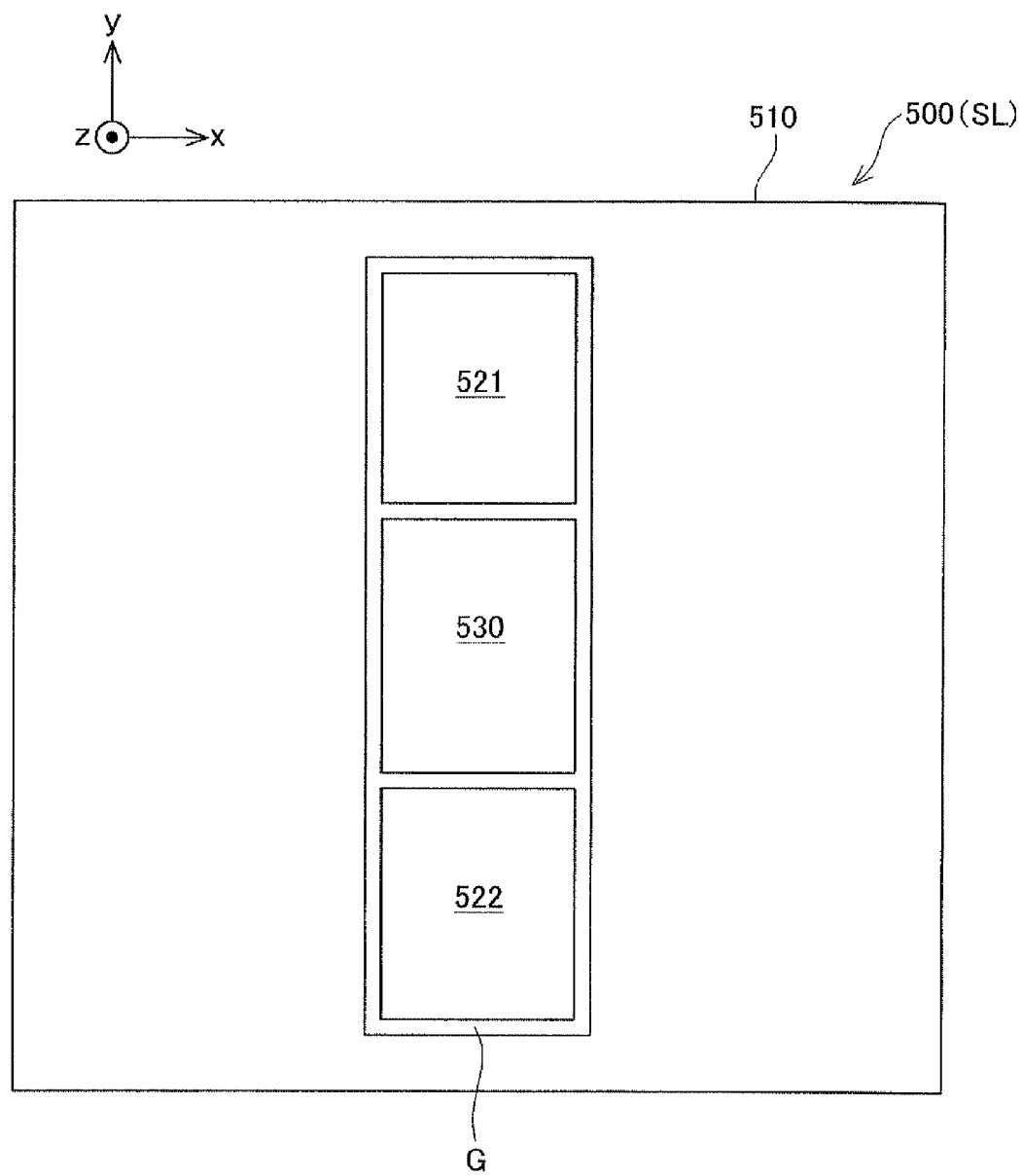
FIG. 5 is a plan-view diagram of the support substrate 500 of the angular rate sensor 10 of the first embodiment.

FIG. 2 illustrates an exploded perspective-view diagram of a state in which the movable body 100 is separated from the support substrate 500. FIG. 3 illustrates a fixed state of the movable body 100 and the two fixed electrodes 221, 222. FIG. 4 illustrates a plan-view diagram of the movable body 100. FIG. 5 illustrates a plan-view diagram of the support substrate 500. The support substrate 500 is divided, by a groove G that runs through the support substrate 500, into an outer substrate 510 (an example of the outside portion), two fixed electrode substrates 521, 522, and an inner substrate 530 (an example of the inside portion), as illustrated in FIG. 5. The pair of excitation electrodes 310, 320 has been omitted in FIG. 2.

The movable body 100 comprises a pair of joining portions 151, 152, as illustrated in FIG. 2. The displacement within the x-y plane of the pair of joining portions 151, 152, which constitute the first movable portion, is thus restricted, as described below. The pair of joining portions 151, 152 is, in another term, a 1-DOT movable body that can move only along the z-axis. The pair of joining portions 151, 152 is composed of the active layer WL. The joining portion 151 is fixed to the inner substrate 530 via an oxide film 735. The joining portion 152 is fixed to the inner substrate 530 via an oxide film 736. The pair of joining portions 151, 152 is formed integrally with the inner substrate 530, and is moved integrally with the inner substrate 530.

The joining portion 151 is supported by two z-axis springs 131, 132. The joining portion 152 is supported by two z-axis springs 133, 134. The four z-axis springs 131, 132, 133, 134 (examples of the first spring portions) are arranged at four positions that are symmetric with respect to the x, y-axes that run through a center Cf of the pair of joining portions 151, 152. Through thinning of the active layer WL, the four z-axis springs 131, 132, 133, 134 are configured such that a spring constant along the z-axis is significantly lower than spring constants in other directions (namely, the x-axis and y-axis directions). The springs are configured in such a manner that so as to allow displacement substantially only along the z-axis.

One end of the z-axis spring 131 is fixed to the outer substrate 510 via an inner fixed portion 141. One end of the z-axis spring 132 is fixed to the outer substrate 510 via an inner fixed portion 142. One end of the z-axis spring 133 is fixed to the outer substrate 510 via an inner fixed portion 143. One end of the z-axis spring 134 is fixed to the outer substrate 510 via an inner fixed portion 144. The four inner fixed portions 141 to 144 (examples of the fixed portion) are arranged at four positions that are symmetric with respect to the x, y-axes that run through the center Cf of the pair of joining portions 151, 152. The four inner fixed portions 141 to 144 are fixed to the outer substrate 510 by way of residual oxide films 741 to 744 at four positions. The four inner fixed portions 141 to 144 are formed within an area defined by a below-described frame block 110.

The movable body 100 is fixed to the outer substrate 510 by way of the four oxide films 741 to 744 that are arranged at the four positions that are symmetrical with respect to the x, y-axes that run through the center Cf of the pair of joining portions 151, 152.

The movable body 100 comprises a frame block 110 (an example of the second movable portion) shaped as a square or rectangular frame (i.e., frame shape), as illustrated in FIG. 4.

The pair of joining portions 151, 152 and the frame block 110 are connected to each other by way of four x-axis springs 121 to 124 (an example of the second spring portion). The four x-axis springs 121, 122, 123, 124 are configured such that a spring constant in the x-axis direction is significantly lower than spring constants in other directions (i.e., the y-axis and the z-axis directions). As a result, the x-axis springs 121, 122, 123, 124 allow displacement substantially only along the x-axis. The joining portions 151, 152 can be moved along the z-axis. The frame block 110 is linked to the joining portions 151, 152 by way of the x-axis springs 121 to 124. As a result, the frame block 110 can be moved along the x-axis. The x-axis springs 121 to 124 cannot be moved along the z-axis, and hence the displacement of the pair of joining portions 151, 152 along the z-axis causes the frame block 110 to respond thereto by being moved along the z-axis accordingly. The frame block 110 can move along the x-axis and the z-axis, but not along the y-axis, with respect to the outer substrate 510. The frame block 110 is a 2-DOF movable body.

The four x-axis springs 121 to 124 that link the pair of joining portions 151, 152 and the frame block 110 are arranged at four positions that are symmetric with respect to the x, y-axes that run through the center Cf of the pair of joining portions 151, 152. The four x-axis springs 121 to 124 are not moved readily along the y-axis, and hence rotation thereof about the center Cf is restricted. The pair of joining portions 151, 152 and the frame block 110 are also constrained so as not to rotate.

More specifically, the pair of x-axis springs 121, 122 connect integrally the frame block 110 and the joining portion 151. The pair of x-axis springs 123, 124 connect integrally the frame block 110 and the joining portion 152. The joining portion 151 joins the pair of x-axis springs 121, 122 with the pair of z-axis springs 131, 132. Similarly, the joining portion 152 joins the pair of two x-axis springs 123, 124 with the pair of z-axis springs 133, 134.

The above connection state has the advantages below. In the present embodiment, specifically, the z-axis springs 131 to 134 are plate springs, thin in the z-axis direction, and larger in size in the x-y plane than in the z-axis direction. As a result, the z-axis springs 131 to 134 exhibit a very high rotational stiffness within the x-y plane. By contrast, each of the x-axis springs 121 to 124 has a U-shaped structure that allows for the displacement along the x-axis within the x-y plane. Therefore, the stiffness of the four x-axis springs 121 to 124 within the x-y plane is lower than that of the z-axis springs 131 to 134. The above configuration allows reducing significantly the rotational motion interference that some accidental motion of the frame block 110, resulting from a disturbance acting on the frame block 110, could exert on the pair of joining portions 151, 152 that are fixed by way of the z-axis springs 131 to 134. In the present embodiment, moreover, the z-axis springs 131 to 134 do not bend with respect to the four inner fixed portions 141 to 144 within the x-y plane, but extend in a substantially straight line, to be connected to the joining portions 151, 152. This precludes as a result drops in stiffness within the x-y plane caused by the presence of bent portions.

The fixed electrode 221 is fixed to the outer substrate 510 via an oxide film 711, and is connected to the fixed electrode substrate 521 via an oxide film 721. The fixed electrode 222 is fixed to the outer substrate 510 via an oxide film 712, and is connected to the fixed electrode substrate 522 via an oxide film 723. Two ends 231, 232 of the fixed electrode 230 (an example of the detection portion) are fixed to the outer substrate 510 via two oxide films 731, 732. The fixed electrode 230 passes above the inner substrate 530 that is connected to the joining portions 151, 152. A gap having a thickness equal to that of the oxide films is formed between the top face of the inner substrate 530 and the bottom face of the fixed electrode 230, in a state where the inner substrate 530 is not moved along the z-axis.

The pair of excitation electrodes 310, 320 (cf. FIG. 1) is fixed to the outer substrate 510 via an oxide film 710 and an oxide film 720, respectively. Comb electrodes CE are formed facing outwards from the sides of the frame block 110 that oppose the pair of excitation electrodes 310, 320. The comb electrodes CE are drawn towards the excitation electrode 310 when the excitation electrode 310 is energized. The comb electrodes CE are drawn towards the excitation electrode 320 when the excitation electrode 320 is energized. The frame block 110 reciprocates in the x-axis direction when the excitation electrode 310 and the excitation electrode 320 are energized alternately. Thus, the pair of excitation electrodes 310, 320 composes an oscillator.

The movable body 100 can operate as explained below in the above-described connected state. The joining portion 151 is connected to the two inner fixed portions 141, 142 (so-called anchors) by way of the z-axis springs 131, 132 that allow displacement substantially only along the z-axis. Therefore, the joining portion 151 can be moved only along the z-axis relative to the outer substrate 510 of the support substrate SL. The same is true of the joining portion 152. The joining portion 151 is fixed to the inner substrate 530 via an oxide film 735. The joining portion 152 is fixed to the inner substrate 530 via an oxide film 736. The joining portion 151 and the joining portion 152 are thus formed integrally with the inner substrate 530 by way of the oxide films 735, 736. The entire integrated portion is supported by the four z-axis springs 131, 132, 133, 134, and can be moved only along the z-axis relative to the outer substrate 510. The joining portions 151, 152 are supported on the four fixed portions 141 to 144 and the four z-axis springs 131, 132, 133, 134 that are distributedly arranged at four positions symmetrically with respect to the x-axis and y-axis that run through the center Cf of the pair of joining portions 151, 152. Thus, the joining portions 151, 152 cannot rotate about the z-axis. The frame block 110 is connected to the joining portions 151, 152 by way of the four x-axis springs 121 to 124 that allow displacement substantially only along the x-axis. Therefore, the frame block 110 can be moved only along the x-axis relative to the joining portions 151, 152.

Figure 6:
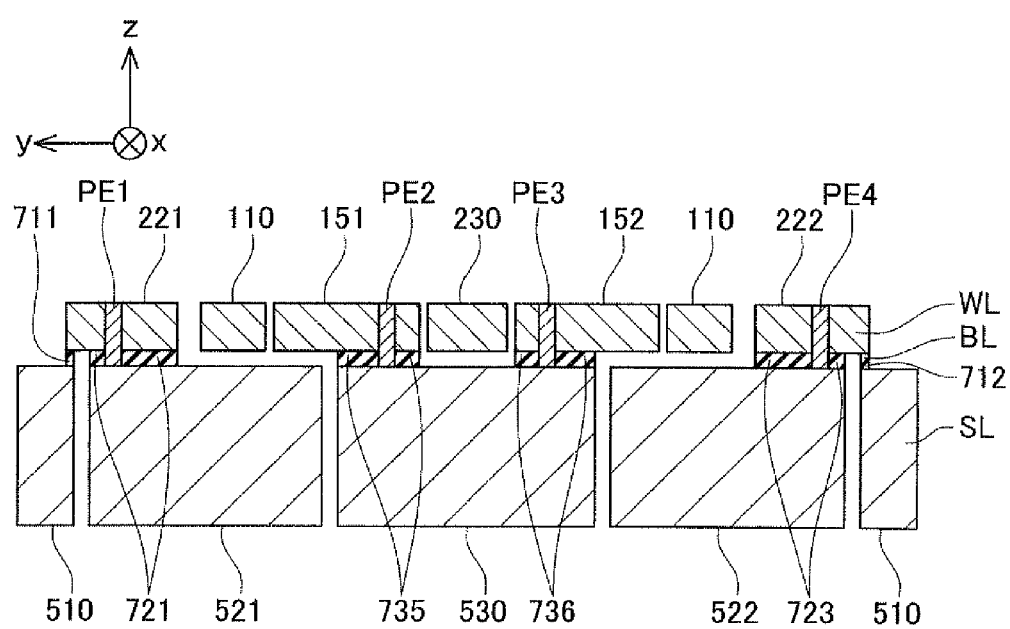
FIG. 6 is a cross-sectional diagram of the angular rate sensor 10 of the first embodiment.

FIG. 6 is a cross-sectional diagram of the angular rate sensor 10. The electric connection state of the angular rate sensor 10 is as follows. In the present embodiment, as illustrated in FIG. 6, the joining portions 151, 152 are electrically connected to the inner substrate 530 by way of two penetrating electrodes PE2, PE3. The frame block 110 is integrally connected to the joining portions 151, 152 by way of the x-axis springs 121 to 124. As a result, the joining portions 151, 152, the frame block 110 and the inner substrate 530 are all electrically connected to each other.

In the present description, the joining portions 151, 152, the frame block 110 and the inner substrate 530 can be moved relative to the outer substrate 510, the two fixed electrode substrates 521, 522 and the fixed electrodes 221, 222, 230, and can therefore be termed as a "movable electrode group". The movable electrode group is configured so as to be substantially plane-symmetrical with respect to a plane perpendicular to the x-axis (i.e., y-z plane) and a plane perpendicular to the y-axis (i.e., x-z plane). A preferred balance is realized thereby in the movable electrode group. This allows suppressing rotation that is not expected in a displacement detector, and allows realizing low-noise angular rate measurement.

Within the above movable electrode group, in particular, a preferred balance between the joining portions 151, 152 and the inner substrate 530 is highly effective in suppressing undesired rotation of the joining portions 151, 152.

The fixed electrode 221 is electrically connected to the fixed electrode substrate 521 by way of the penetrating electrode PE1. The fixed electrode 222 is electrically connected to the fixed electrode substrate 522 by way of the penetrating electrode PE4. In the present description, the fixed electrode 230, the fixed electrode substrate 521 and the fixed electrode substrate 522 are termed as a "fixed electrode group".

Figure 7:
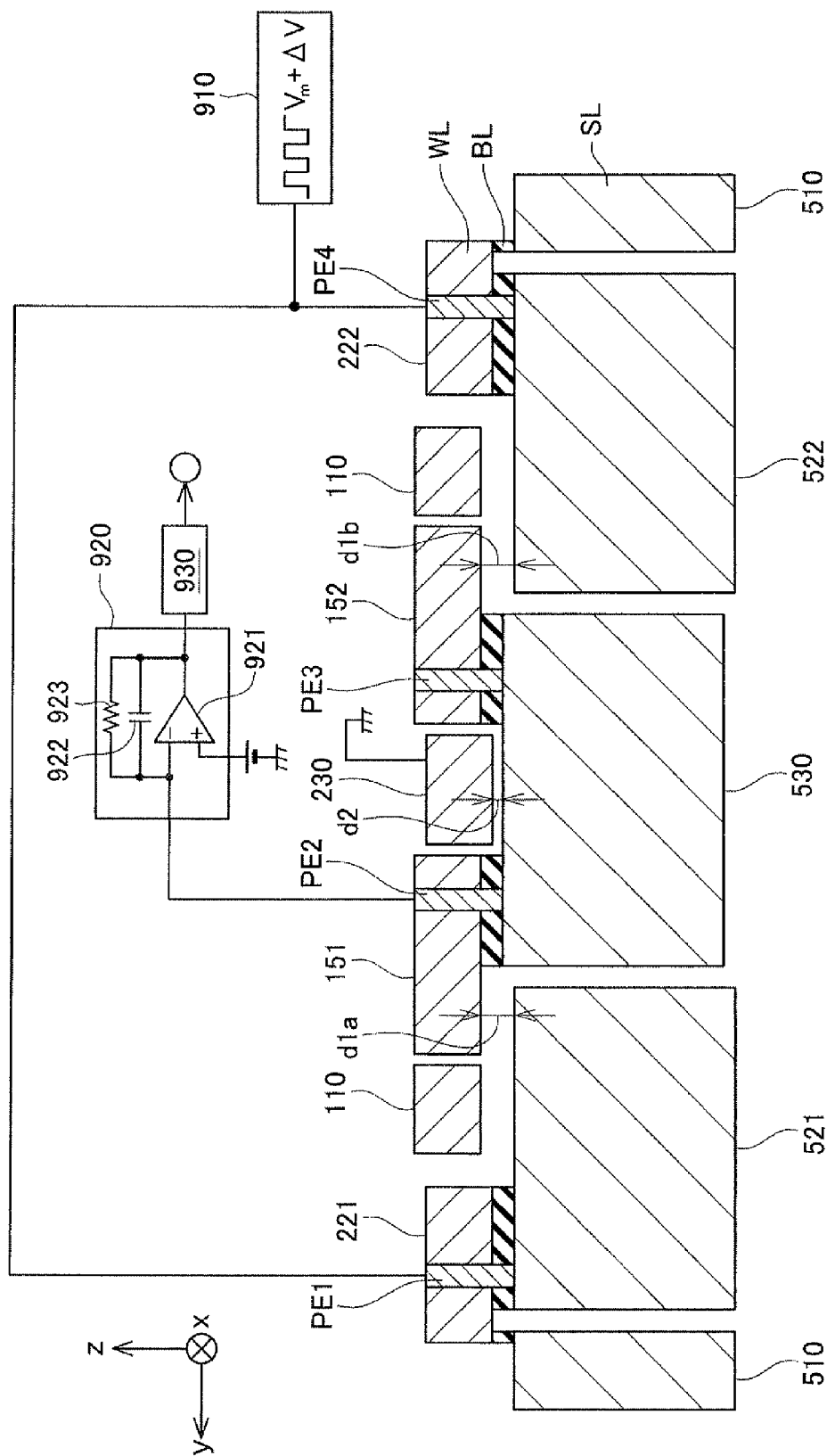
FIG. 7 illustrates a cross-sectional diagram of an operation state of the angular rate sensor 10 of the first embodiment.

FIG. 7 is a cross-sectional diagram of the operation state of the angular rate sensor 10 of the first embodiment. The angular rate sensor 10 can measure the angular rate about the y-axis on the basis of the displacement along the z-axis of the movable electrode group (which includes the joining portions 151, 152, frame block 110, and inner substrate 530) in response to the rotation about the y-axis. The displacement of the movable electrode group in the z-axis direction is the result of the Coriolis force generated in the frame block 110 in response to the angular rate about the y-axis. The Coriolis force is generated in the frame block 110 since the frame block 110 is reciprocated in the x-axis direction by the pair of excitation electrodes 310, 320. The Coriolis force generated in the frame block 110 causes the frame block 110 to be moved along the z-axis. This displacement is transmitted to the joining portions 151, 152 by way of the four x-axis springs 121 to 124 that allow displacement substantially only along the x-axis. In this transmission process, the four x-axis springs 121 to 124 absorb the oscillation of the frame block 110 in the x-axis direction.

The displacement along the z-axis is converted to an electric output through differential changes of capacitance between the movable electrode group and the fixed electrode group. Specifically, as illustrated in FIG. 7, when the movable electrode group is moved in the positive direction along the z-axis, a distance d2 between the opposing surfaces of the fixed electrode 230 and the inner substrate 530 decreases, while a distance d1$a$ between the respective opposing surfaces of the joining portion 151 or the frame block 110, and the fixed electrode substrate 521 increases, and a distance d1$b$ between the respective opposing surfaces of the joining portion 152, or the frame block 110, and the fixed electrode substrate 522 also increases.

The above-mentioned differential change is outputted, as an electric signal that contains angular rate information denoting angular rate, by way of a carrier signal generation unit 910, a C-V conversion unit 920 and an AM demodulation circuit 930, as described below. The carrier signal generation unit 910, the C-V conversion unit 920 and the AM demodulation circuit 930 compose a detection unit. Specifically, the carrier signal generation unit 910 applies a carrier voltage to the fixed electrode group (the two fixed electrode substrates 521, 522). A capacitor is formed between the fixed electrode group and the movable electrode group (the joining portions 151, 152 and so forth). To this capacitor, there is connected in series a capacitor formed between the movable electrode group (inner substrate 530) and the fixed electrode 230, which is connected to a ground. These two capacitors connected in series generate a split voltage potential. The split voltage potential is amplified by the C-V conversion unit 920 that comprises an op-amp 921, a capacitor 922 and a resistor 923, and is outputted by the AM demodulation circuit 930, in the form of an analog electric signal that comprises the angular rate information denoting the angular rate.

In the first embodiment, thus, the joining portions 151, 152 fixed to the inner substrate 530 are fixed to the outer substrate 510 at four positions symmetrical with respect to the x, y-axes that pass through the center Cf of the pair of joining portions 151, 152. The above fixing is accomplished by way of the z-axis springs 131 to 134 that allow displacement substantially only in the z-axis direction, and which afford a strong confinement within the x-y plane. The joining portions 151, 152 are thus fixed with high rotational stiffness within the x-y plane which inhibits rotation. As a result, the inner substrate 530 and the joining portions 151, 152 that are movable relative to the outer substrate 510 are strongly constrained within the x-y plane. This allows suppressing interference from unwanted rotational motion. Undesired creeping of errors into the angular rate, which is measured according to the displacement of the joining portions 151, 152, can be suppressed as a result.

In the present embodiment, the frame block 110 is connected at connection positions that are symmetrical with respect to the x, y-axes that pass through the center Cf of the pair of joining portions 151, 152. Therefore, the exertion of rotational moment on the joining portions 151, 152 can be significantly reduced, even upon translational movement of the frame block 110.

In the present embodiment, the frame block 110 is connected at four connection positions at which the four x-axis springs 121 to 124 are connected, but may alternately be connected at two positions, or at six or more positions. The greater the number of connection positions, the better suppressed is the interference from unwanted rotational motion into the frame block 110, since the frame block 110 is fastened with high stiffness to the outer substrate 510 by way of the joining portions 151, 152. On the other hand, a smaller number of connection positions allows reducing the influence of disturbances from the frame block 110. Analyses and experiments by the inventors of the present application have revealed that the above configuration affords excellent resistance to oscillatory disturbances and excellent resistance to shocks. Resistance to oscillatory disturbances is a useful property in mobile objects such as automobiles. Resistance to shocks is a useful property for accident sensing in mobile objects such as automobiles.

The above configuration is suitable, in particular, for being manufactured using semiconductor manufacturing processes. The rotational stiffness of stack planes can be used effectively, and thus there is substantial freedom in the design of outer fixed portions and conductive layer connections. The above configuration is also advantageous in that it allows suppressing warpage, thereby reducing manufacturing error. In particular, the above configuration elicits a significant effect when there are used materials having a high film deposition temperature accompanied with substantial thermal stress, such as polysilicon and SiGe. In terms of temperature characteristics, moreover, the above configuration allows limiting the occurrence of measurement errors and displacement errors caused by changes in temperature.

Figure 8:
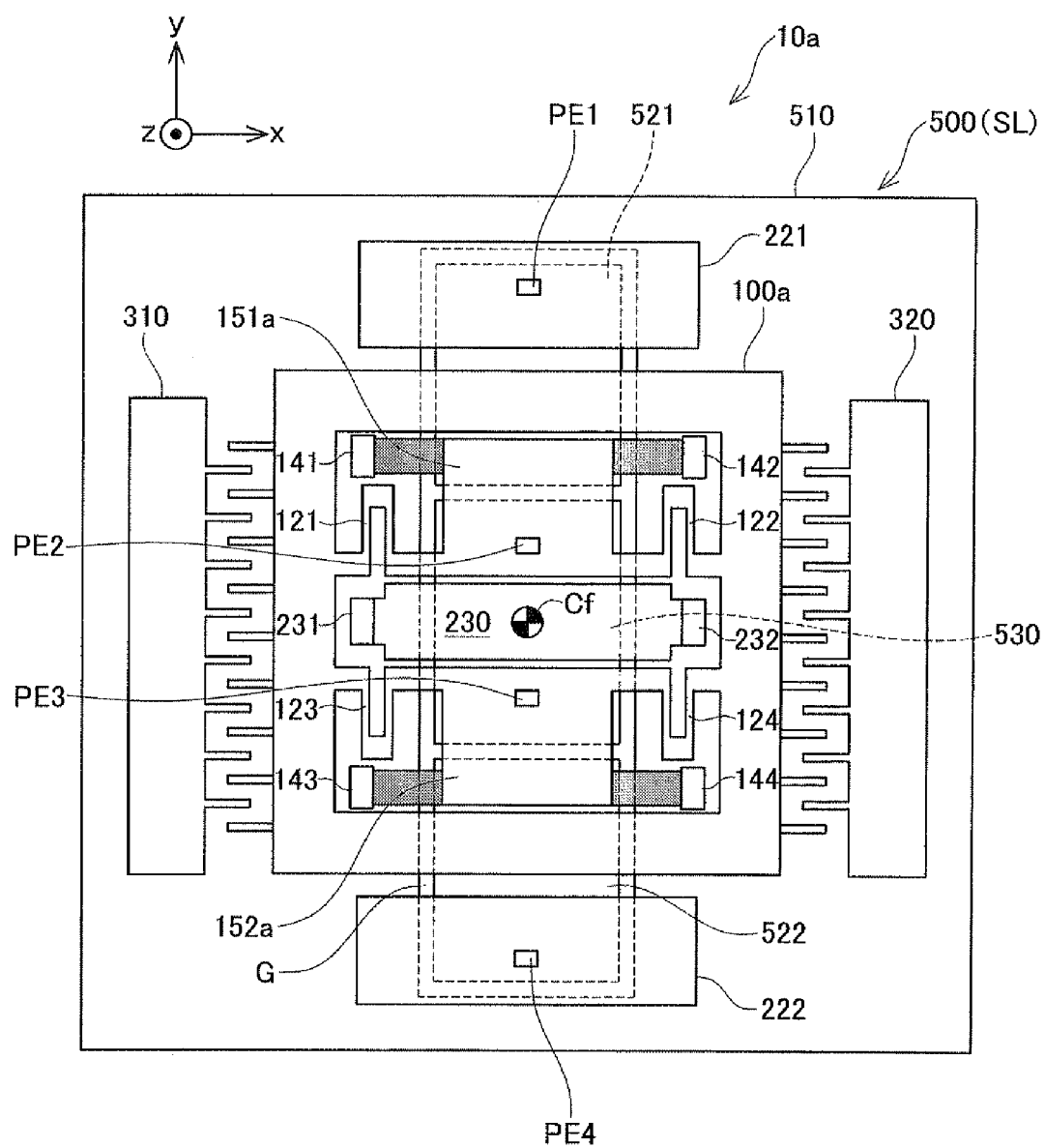
Figure 9:
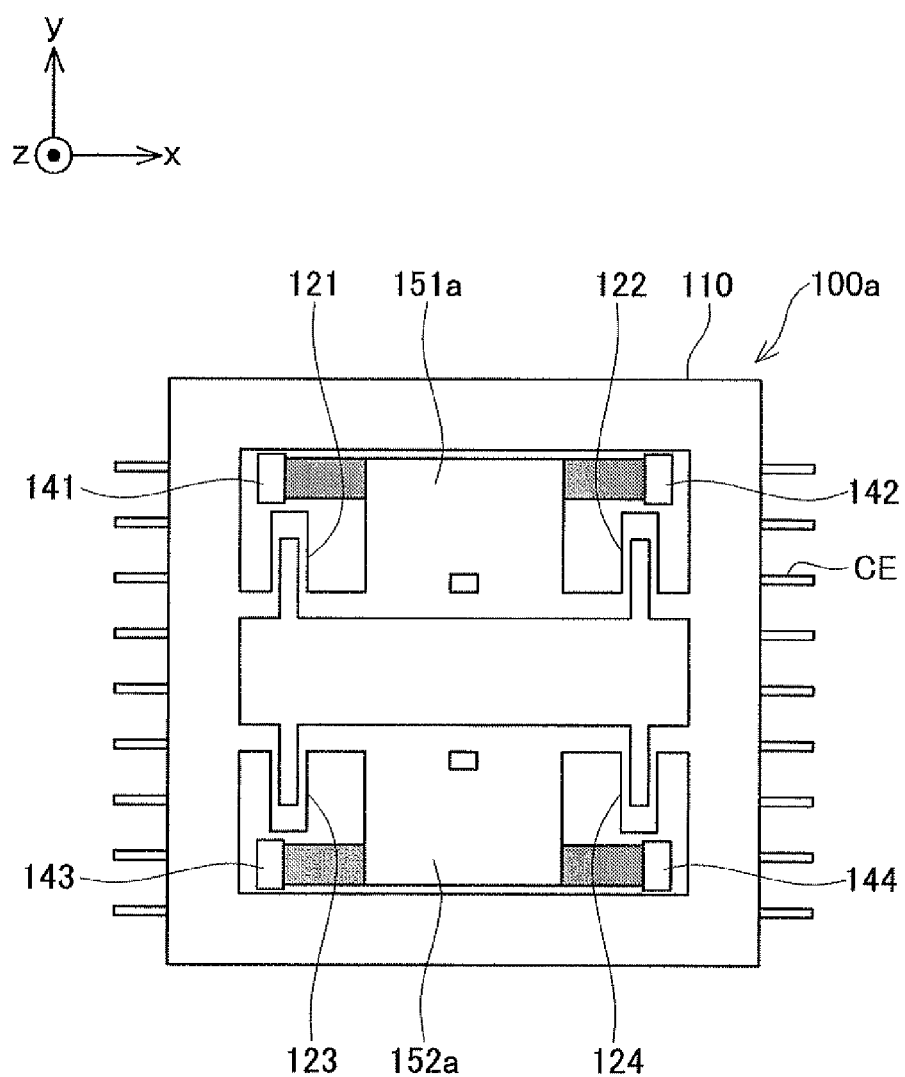
FIG. 9 illustrates a plan-view diagram of the movable body 100a of the second embodiment.

B. Configuration of an Angular Rate Sensor According to the Second Embodiment:

FIG. 8 illustrates the configuration of an angular rate sensor 10$a$ comprising a movable body 100$a$ according to the second embodiment. FIG. 9 illustrates the configuration of the movable body 100$a$ of the second embodiment. The movable body 100$a$ of the second embodiment differs from the movable body 100 of the first embodiment in that, here, the joining portions 151, 152 of the first embodiment are changed to joining portions 151$a$, 152$a$ of the second embodiment. Otherwise, the angular rate sensor 10$a$ of the second embodiment shares the same features of the angular rate sensor 10 of the first embodiment.

The joining portions 151a, 152a of the second embodiment differ from the joining portions 151, 152 of the first embodiment (FIG. 4) in that the connection positions of the inner fixed portions 141 to 144 and the x-axis springs 121 to 124 are exchanged. Specifically, the positions of the inner fixed portion 141 and the x-axis spring 121 are exchanged, and the positions of the inner fixed portion 142 and the x-axis spring 122 are likewise exchanged, in the joining portion 151a. Similarly, the positions of the inner fixed portion 143 and 144 are respectively exchanged with the x-axis springs 123 and 124 in the joining portion 152a. As a result of the above exchange, the four inner fixed portions 141 to 144 in the second embodiment are arranged at positions farther apart from the center Cf of the joining portions 151a, 152a than is the case in the first embodiment.

In the second embodiment, thus, the frame block 110 is strongly constrained within the x-y plane relative to the outer substrate 510, since the four inner fixed portions 141 to 144 are arranged at positions more spaced apart. Oscillation of the rotational motion of the frame block 110 is suppressed as a result, and interference from undesired rotational motion of the frame block 110 acting on the joining portions 151a, 152a is suppressed to a greater extent than in the first embodiment. A higher measurement precision can be achieved thereby.

Figure 10:
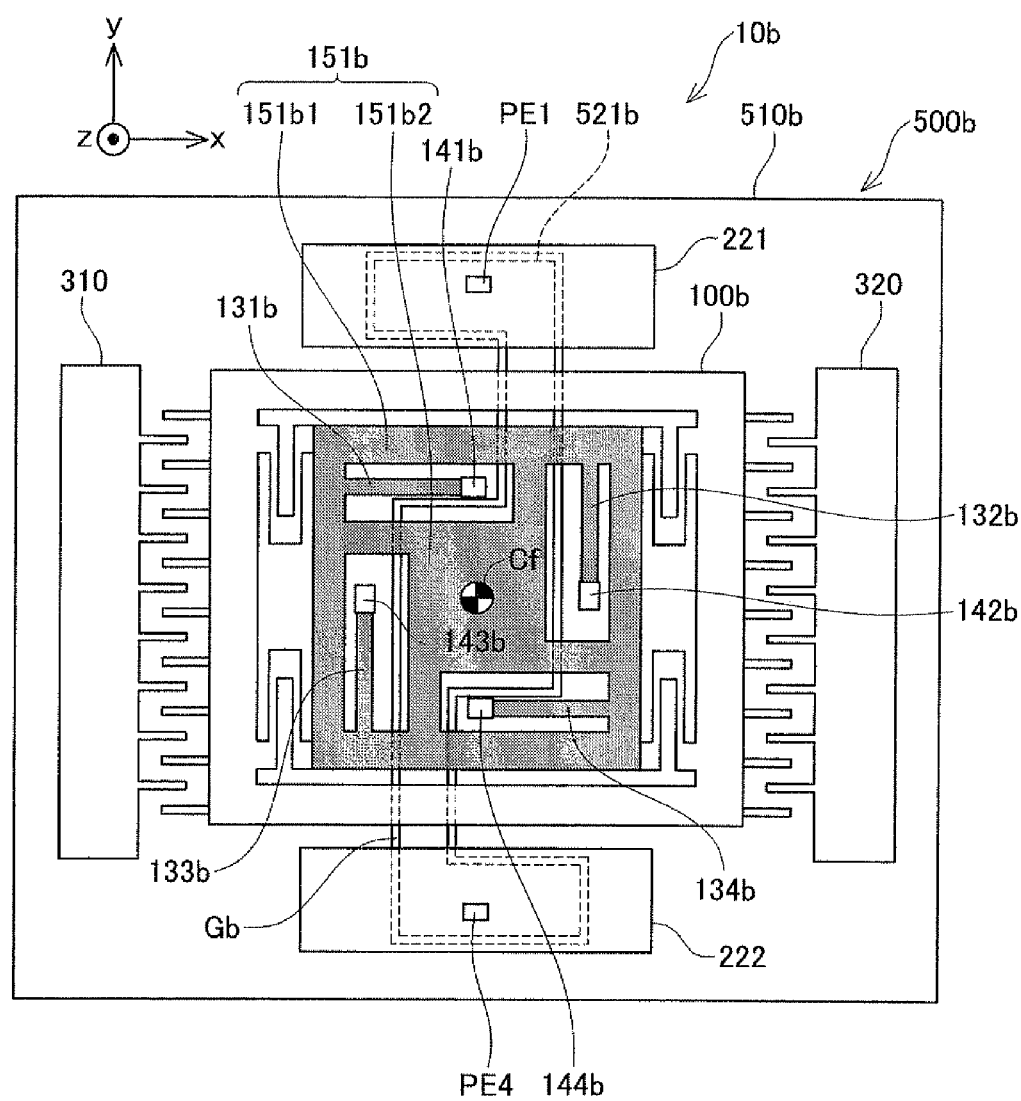
FIG. 10 is a plan-view diagram of an angular rate sensor 10b of a third embodiment, comprising a movable body 100b.
Figure 11:
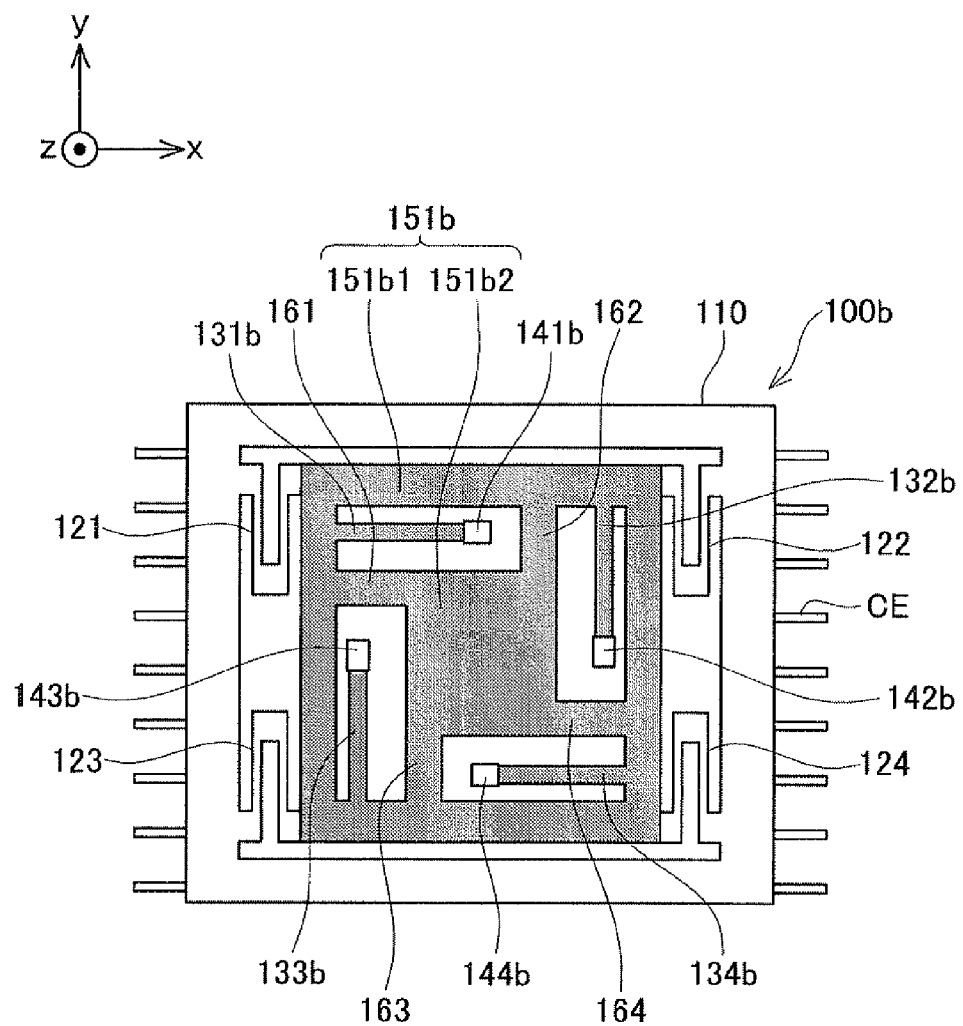
FIG. 11 illustrates a plan-view diagram of the movable body 100b of the third embodiment.
Figure 12:
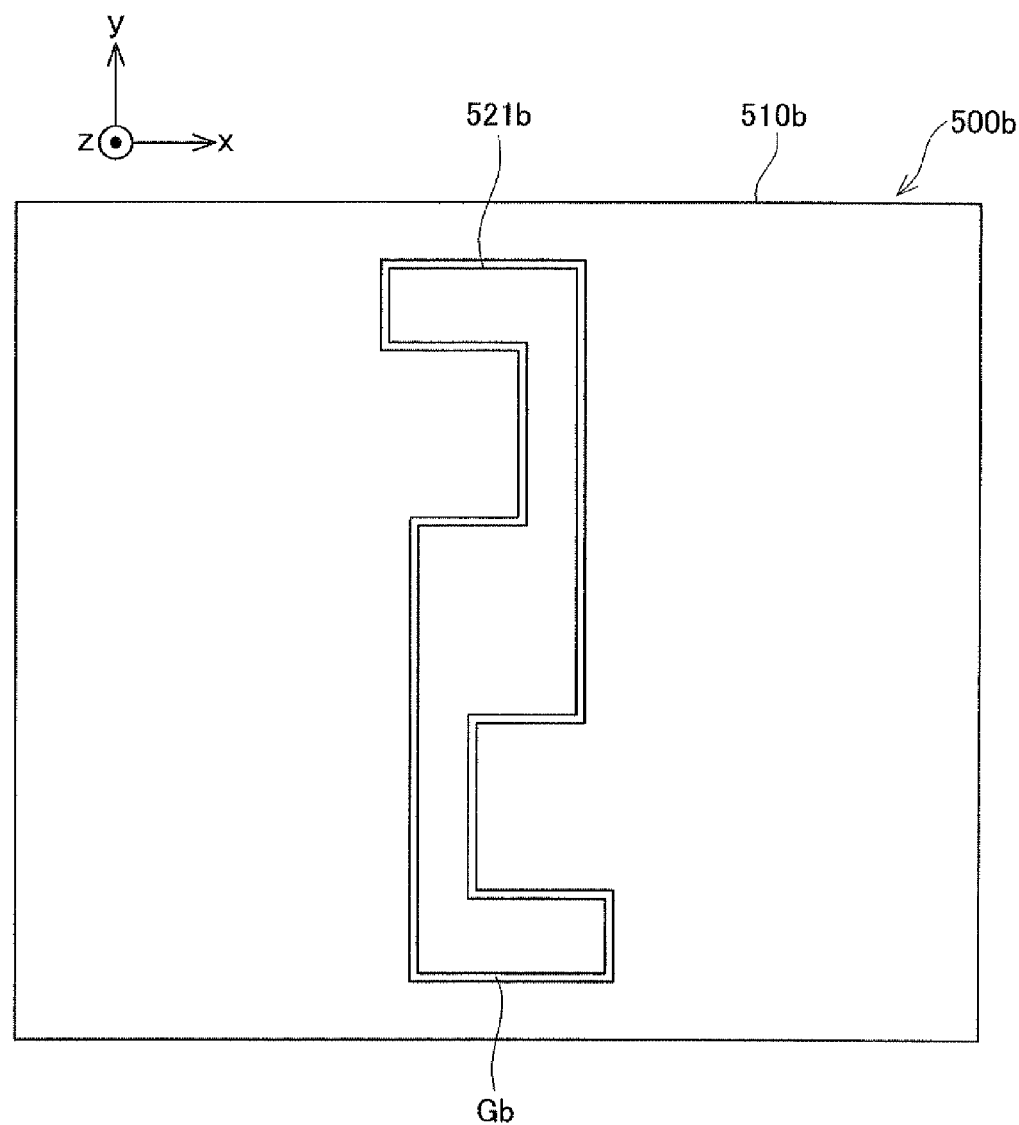
FIG. 12 is a plan-view diagram of the support substrate 500b of the angular rate sensor 10b of the third embodiment.

C. Configuration of an Angular Rate Sensor According to a Third Embodiment of the Present Invention:

The third embodiment will be describes with reference to FIGS. 10-12. An angular rate sensor 10b of the third embodiment differs from the angular rate sensor 10 of the first embodiment in that the movable body 100 and the support substrate 500 of the first embodiment are changed to a movable body 100b and a support substrate 500b, and in that two penetrating electrodes PE2, PE3 of the first embodiment have been omitted.

The movable body 100b of the third embodiment differs from the movable body 100 of the first embodiment in that the movable body 100b is fixed to a support outer substrate 510b in a swastika layout. The specific dissimilar features are as follows (cf. FIG. 11).

(1) The pair of joining portions 151, 152 is changed to one joining portion 151b (an example of the first movable portion).
(2) The inner fixed portions 141 to 142 are changed to inner fixed portions 141b to 142b.
(3) The z-axis springs 131 to 134 are changed to z-axis springs 131b to 134b.

The joining portion 151b of the third embodiment comprises a rectangular frame-like joining frame 151b1 and a movable electrode portion 151b2 that functions as a movable electrode. The movable electrode portion 151b2 has four functional portion connections 161 to 164 via which the movable electrode portion 151b2 is connected to the joining frame 151b1. The joining frame 151b1 and the constituent elements in the joining frame 151b1 (the movable electrode portion 151b2, the four functional portion connections 161 to 164 and the z-axis springs 131b to 134b) are configured in such a manner that the thickness of each of the constituent elements in the z-axis direction is thinner than that of the other elements of the movable body 100b. Inertial mass is reduced and the z-axis springs 131b to 134b are made anisotropic as a result. From among the four z-axis springs 131b to 134b, two z-axis springs 131b, 134b (an example of the first group) extend along the x-axis, while two z-axis springs 132b, 133b (an example of the second group) extend along the y-axis. The anisotropy of the z-axis springs 131b to 134b has an effect of enabling displacement substantially only along the z-axis.

In the joining frame 151b1 having the above configuration, the four x-axis springs 121 to 124 and the four z-axis springs 131b to 134b are linked as illustrated in FIG. 11, as in the case of the joining portions 151, 152 of the first embodiment. Therefore, the joining frame 151b1 behaves in the same way as the joining portions 151, 152 of the first embodiment in response to a Coriolis force.

The inner fixed portions 141b to 142b of the third embodiment are arranged outside the movable electrode portion 151b2, and within the joining frame 151b1. The joining frame 151b1 is fixed to the support outer substrate 510b, in the swastika layout, by the four inner fixed portions 141b to 142b, at positions symmetrical with respect to the x, y-axes that pass through the center Cf of the joining portion 151b, as is the case in the first embodiment. As in the above-described first embodiment, this fixing is accomplished by way of the z-axis springs 131b to 134b that allow displacement substantially only in the z-axis direction, and which afford a strong confinement within the x-y plane. Therefore, the joining portion 151b of the third embodiment is fixed with high rotational stiffness within the x-y plane.

The z-axis springs 131b to 134b of the third embodiment differ from those in the first embodiment. Herein, the z-axis springs 131b to 134b connect the joining frame 151b1 and the four inner fixed portions 141b to 142b that extend along directions symmetrical with respect to the x, y-axes that run through the center Cf of the joining portion 151b, within the joining frame 151b1. In the above configuration, there is generated only an axial-direction load (tensile load or compressive load) in response to input of rotational moment to the joining frame 151b1. Therefore, the joining frame 151b1 can be moved along the z-axis while being effectively fixed with high rotational stiffness, under suppression of coupling (influence) to other axes.

The movable electrode portion 151b2 of the third embodiment is connected to the joining frame 151b1 by way of the four functional portion connections 161 to 164. As a result, the movable electrode portion 151b2 is moved together with the joining frame 151b1 along the z-axis. The movable electrode portion 151b2 has, in the z-axis direction, an opposing surface that faces part of the movable support substrate 500b of the third embodiment.

The support substrate 500b of the third embodiment is divided, by a groove G that runs through the support substrate SL, into a fixed electrode substrate 521b and an outer substrate 510b. The fixed electrode substrate 521b has an opposing surface that faces the movable electrode portion 151b2. The fixed electrode substrate 521b is electrically connected to two fixed electrodes 221, 222 by way of two penetrating electrodes PE1, PE4.

Similarly to the first embodiment, the angular rate sensor 10b can measure the angular rate about the y-axis on the basis of the displacement of the movable electrode portion 151b2 along the z-axis in response to rotation about the y-axis. This displacement is converted into an electric output in the form of changes in capacitance between the movable electrode portion 151b2 and the fixed electrode substrate 521b. The output is outputted to the two fixed electrodes 221, 222, taking the potential of the outer substrate 510b as the reference potential.

In the third embodiment, thus, the joining portion 151b having the movable electrode portion 151b2 is connected to the four inner fixed portions 141b to 142b by way of the z-axis springs 131b to 134b that extend along directions substantially symmetrical with respect to the center Cf of the joining portion 151b. As a result, the joining portion 151b can be effectively fixed with high rotational stiffness, and also suppress coupling (influence) to other axes. Unlike in the first embodiment and the second embodiment, the electric output in the third embodiment is not a differential output.

Figure 13:
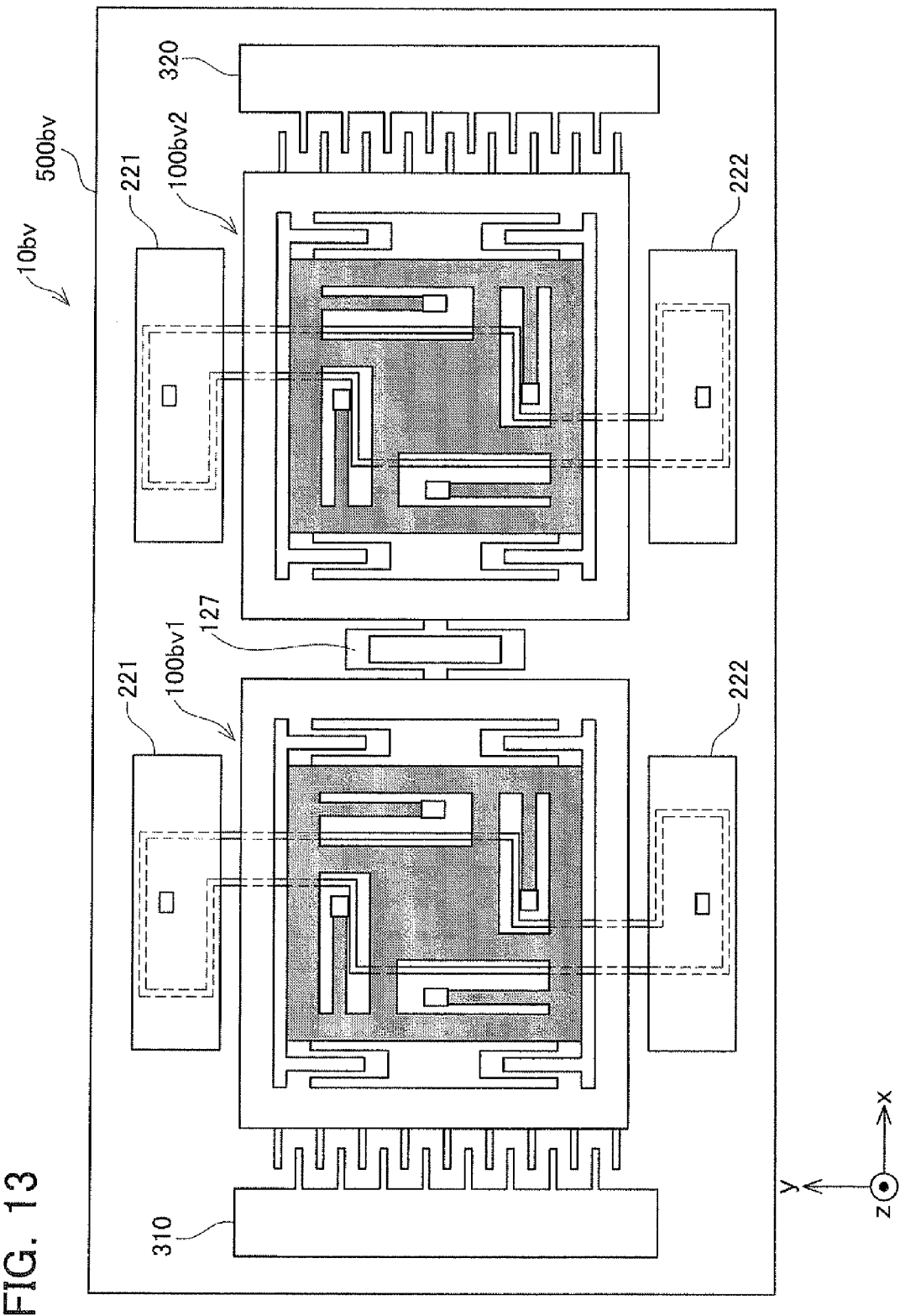
FIG. 13 is an explanatory diagram illustrating the configuration of an angular rate sensor 10bv according to a variant of the third embodiment.

FIG. 13 is an explanatory diagram illustrating the configuration an angular rate sensor 10bv according to a variant of the third embodiment. To realize differential output, the angular rate sensor 10bv is provided with two movable bodies 100bv1, 100bv2 on a support substrate 500bv. The movable body 100bv1 differs from the movable body 100b of the third embodiment in that the comb electrode element CE on the right side is removed, and one end of an x-axis spring 127 is connected at the site where the aforesaid comb electrode element CE had been located, as illustrated in FIG. 13. The movable body 100bv2, having a configuration in which the comb electrode element CE on the left side is removed from the movable body 100b, is connected to the other end of the x-axis spring 127. The x-axis spring 127 is configured so as to have a spring constant in the x-axis direction that is significantly lower than spring constants in other directions, namely in the y-axis and z-axis directions. As a result, the x-axis spring 127 allows displacement substantially only along the x-axis.

The angular rate sensor 10bv moves as a tuning fork in response to the elastic deformation of the x-axis spring 127. Specifically, the two movable bodies 100bv1, 100bv2 repeatedly approach and move away from each other in response to the extension and contraction of the x-axis spring 127. In such a motion, the two movable bodies 100bv1, 100bv2 move normally in mutually opposite directions. A Coriolis force acts as a result on the two movable bodies 100bv1, 100bv2, on mutually opposing directions, in response to an input of angular rate. The change in capacitance between the movable body 100bv1 side and the movable body 100bv2 side reverses as a result, and thus the change in capacitance can be extracted in the form of a differential output.

As explained above, the differential output can be obtained by way of a movable body configured in the manner of the movable bodies 100bv1, 2 of the third embodiment.

Figure 14:
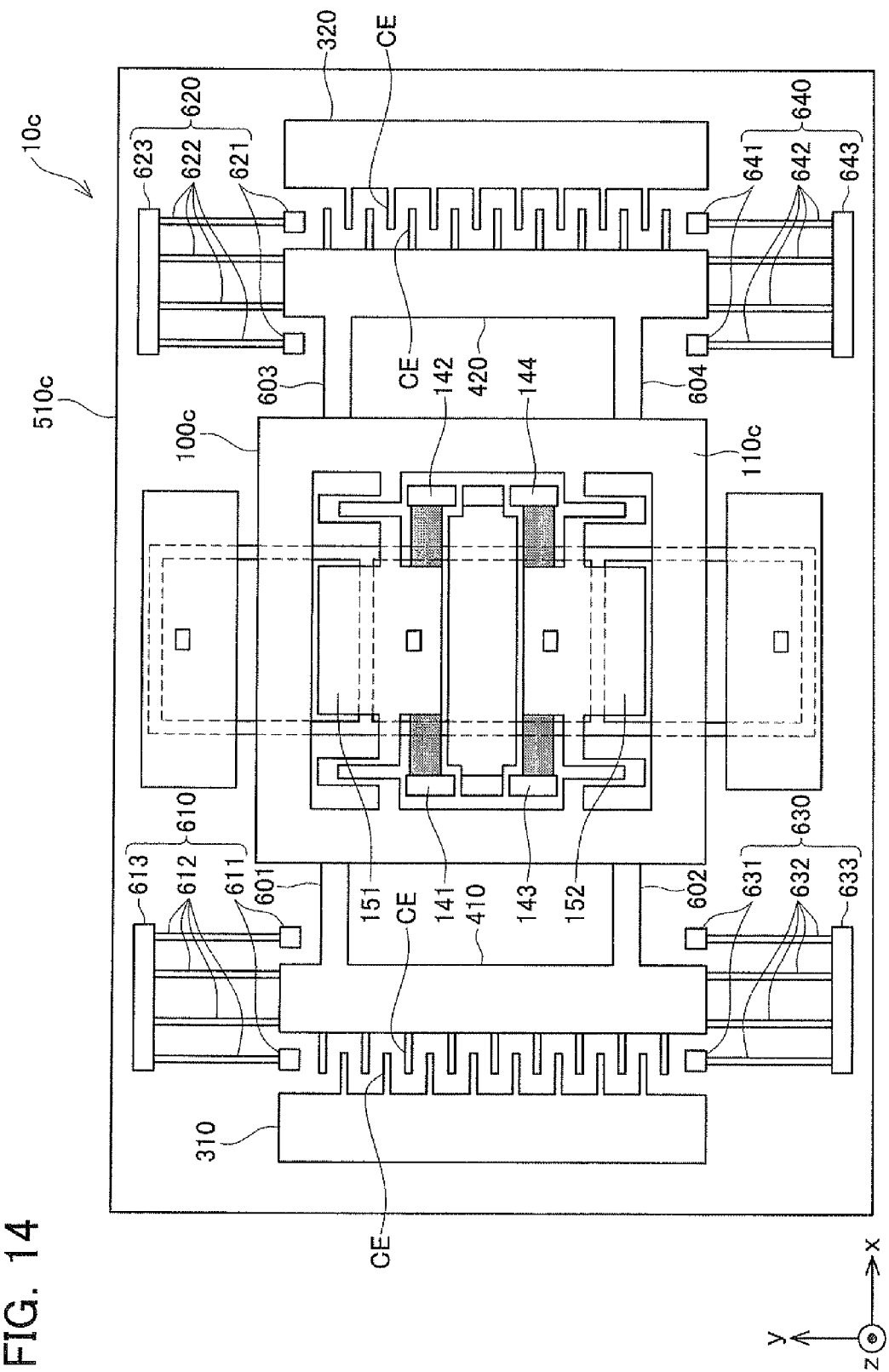
FIG. 14 is a plan-view diagram of an angular rate sensor 10c of a fourth embodiment, comprising a movable body 100c.

D. Configuration of an Angular Rate Sensor According to a Fourth Embodiment of the Present Invention:

FIG. 14 is an explanatory diagram illustrating the configuration an angular rate sensor 10c comprising a movable body 100c according to a fourth embodiment of the present invention. The movable body 100c of the fourth embodiment differs from the movable body 100 of the first embodiment in that the movable body 100c has two comb electrode joining portions 410, 420, four second z-axis springs 601 to 604 (examples of the movable side spring portion) and four bending springs 610 to 640. The two comb electrode joining portions 410, 420 (examples of the third movable portion) are integrally connected, by the second z-axis springs 601 to 604, to the left and right of a frame block 110c of the movable body 100c. Each of the second z-axis springs 601 to 604 has a spring constant in the z-axis direction that is significantly smaller than the spring constant in the x-axis direction and the spring constant in the y-axis direction. As a result, the second z-axis springs 601 to 604 allow displacement substantially only along the z-axis. The movement of the two comb electrode joining portions 410, 420 is constrained along the x-axis by the four bending springs 610 to 640.

The bending spring 610 has on a support substrate 500c two outer fixed portions 611 (examples of the second fixed portion), four bending spring bodies 612, and a bending spring linking portion 613. The four bending spring bodies 612 are connected to the bending spring linking portion 613. Two out of the four bending spring bodies 612 are connected to the support substrate 500c at the two outer fixed portions 611. The other two bending spring bodies 612 are connected to the top end of the comb electrode joining portion 410. Each bending spring body 612 and bending spring linking portion 613 composes a fixed side spring portion. The four bending spring bodies 612 have a spring constant in the x-axis direction that is significantly lower than the spring constant in other directions. As a result, the bending spring bodies 612 allow displacement substantially only along the x-axis. Each of the other three bending springs 620 to 640 have the same configuration as the bending spring 610, and have outer fixed portions 621, 631, 641 (examples of a second fixed portion), four bending spring bodies 622, 632, 642, and bending spring linking portions 623, 633, 643. The comb electrode joining portion 410, the second z-axis springs 601, 602, the bending spring bodies 612, 632, and the bending spring linking portions 613, 633 constitute a third spring portion. Further, the comb electrode joining portion 420, the second z-axis springs 603, 604, the bending spring bodies 622, 642, and the bending spring linking portions 623, 643 also constitute a third spring portion.

The comb electrode joining portion 410 is connected to the two bending springs 610, 630, as described above. As a result, the comb electrode joining portion 410 is connected to the four outer fixed portions 611, 631 via the eight bending spring bodies 612, 632. The bending spring bodies 612, 632 are configured so as to allow displacement substantially only along the x-axis. Therefore, the displacement of the comb electrode joining portion 410 relative to the two outer fixed portions 611 and the two outer fixed portions 631 is permitted only along the x-axis. As is the case with the comb electrode joining portion 410, the displacement of the comb electrode joining portion 420 is permitted only along the x-axis. As a result, the movable body 100c is connected to the eight outer fixed portions 611, 621, 631, 641 via the bending spring bodies 612, 622, 632, 642, whereby the movable body 100c is fixed to the support substrate 500c with high rotational stiffness.

In the fourth embodiment, thus, the movable body 100c is fixed within the frame block 110c by the four inner fixed portions 141 to 144, and is fixed outside the frame block 110c by the eight outer fixed portions 611, 621, 631, 641. As a result, the movable body 100c can be fastened to the outer substrate 510c with very high rotational stiffness, whereby interference from undesired rotational motion can be significantly suppressed.

Figure 15:
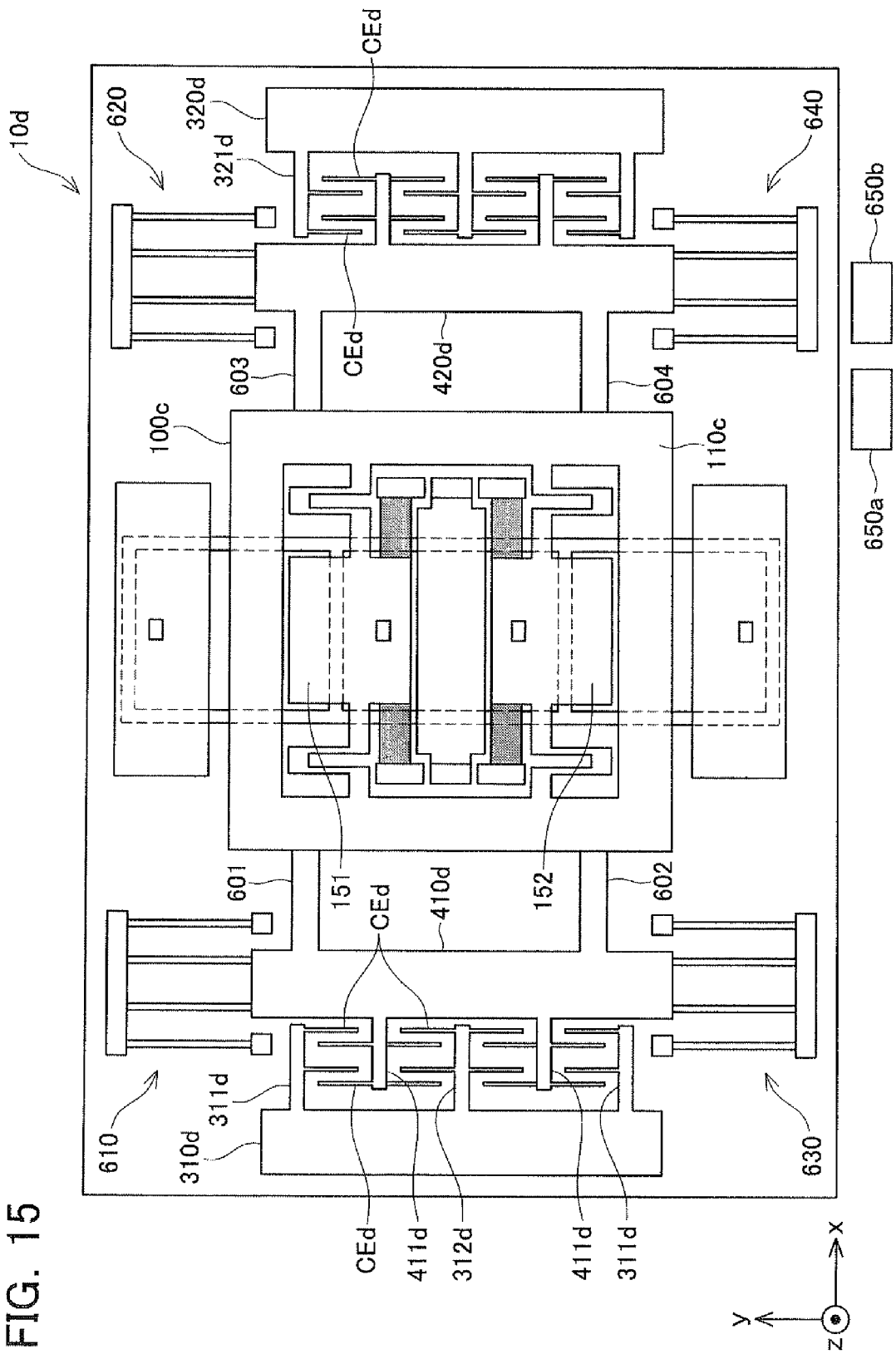
FIG. 15 is a plan-view diagram of a biaxial acceleration sensor 10d according to a fifth embodiment.

E. Configuration of a Biaxial Acceleration Sensor According to a Fifth Embodiment of the Present Invention:

FIG. 15 is an explanatory diagram illustrating the configuration of a biaxial acceleration sensor 10d according to a fifth embodiment of the present invention. The biaxial acceleration sensor 10d in the fifth embodiment is configured using the movable body 100c of the fourth embodiment. The biaxial acceleration sensor 10d differs from the angular rate sensor 10c of the fourth embodiment in that the two excitation electrodes 310, 320 are changed to two detection electrodes 310d, 320d, and the two comb electrode joining portions 410, 420 are changed to two comb electrode joining portions 410d, 420d.

The detection electrode 310d comprises two electrode element support members 311d each of which has two comb electrode elements CEd, and an electrode element support member 312d that supports four comb electrode elements CEd. The comb electrode joining portion 410d has two electrode element support members 411d each of which supports four comb electrode elements CEd. The detection electrode 320d and the comb electrode joining portion 420d are configured to be symmetrical with respect to the detection electrode 310d and the comb electrode joining portion 410d.

The detection electrode 310d and the comb electrode joining portion 410d operate as follows. The frame block 110c of the movable body 100e executes a translational motion along the x-axis (positive direction) upon acceleration of the biaxial acceleration sensor 10d along the x-axis (negative direction). In response to the translation motion of the frame block 110c along the x-axis, the comb electrode joining portion 410d moves integrally with the frame block 110c. When the comb electrode joining portion 410d moves along the x-axis, the eight comb electrode elements CEd of the comb electrode joining portion 410d approach the comb electrode elements CEd of the detection electrode 310d. As a result, the capacitance between the detection electrode 310d and the comb electrode joining portion 410d is changed. The detection electrode 320d and the comb electrode joining portion 420d operate in the same manner as the detection electrode 310d and the comb electrode joining portion 410d. Acceleration in the x-axis direction can thus be measured in accordance with the changes in the capacitance. A second detection unit 650b operates under the same principle as the detection unit of the first embodiment, namely through changes in output that depends on the changes in the above-described capacitance. Specifically, the output of the second detection unit 650b varies depending on the displacement of the comb electrode joining portions 410d, 420d.

When the biaxial acceleration sensor 10d is subjected to acceleration in the z-axis direction, the frame block 110e having inertial mass is moved in response to acceleration in the z-axis direction, together with the pair of joining portions 151, 152 and the inner substrate 530. Acceleration in the z-axis direction can be measured on the basis of the changes in the capacitance that accompany the above displacement. When the biaxial acceleration sensor 10d of the present embodiment undergoes acceleration in the z-axis direction (negative direction) the joining portions 151, 152 move translationally along the z-axis (positive direction). The output of a first detection unit 650a, having the same configuration as the detection unit of the first embodiment, changes thereupon depending on the displacement of the joining portions 151, 152.

In the fifth embodiment, thus, the biaxial acceleration sensor 10d is realized using the movable body 100c of the fourth embodiment. The biaxial acceleration sensor can be realized using not only the movable body 100e of the fourth embodiment, but alternatively the movable bodies 100, 100a of the first embodiment and the second embodiment.

Figure 16:
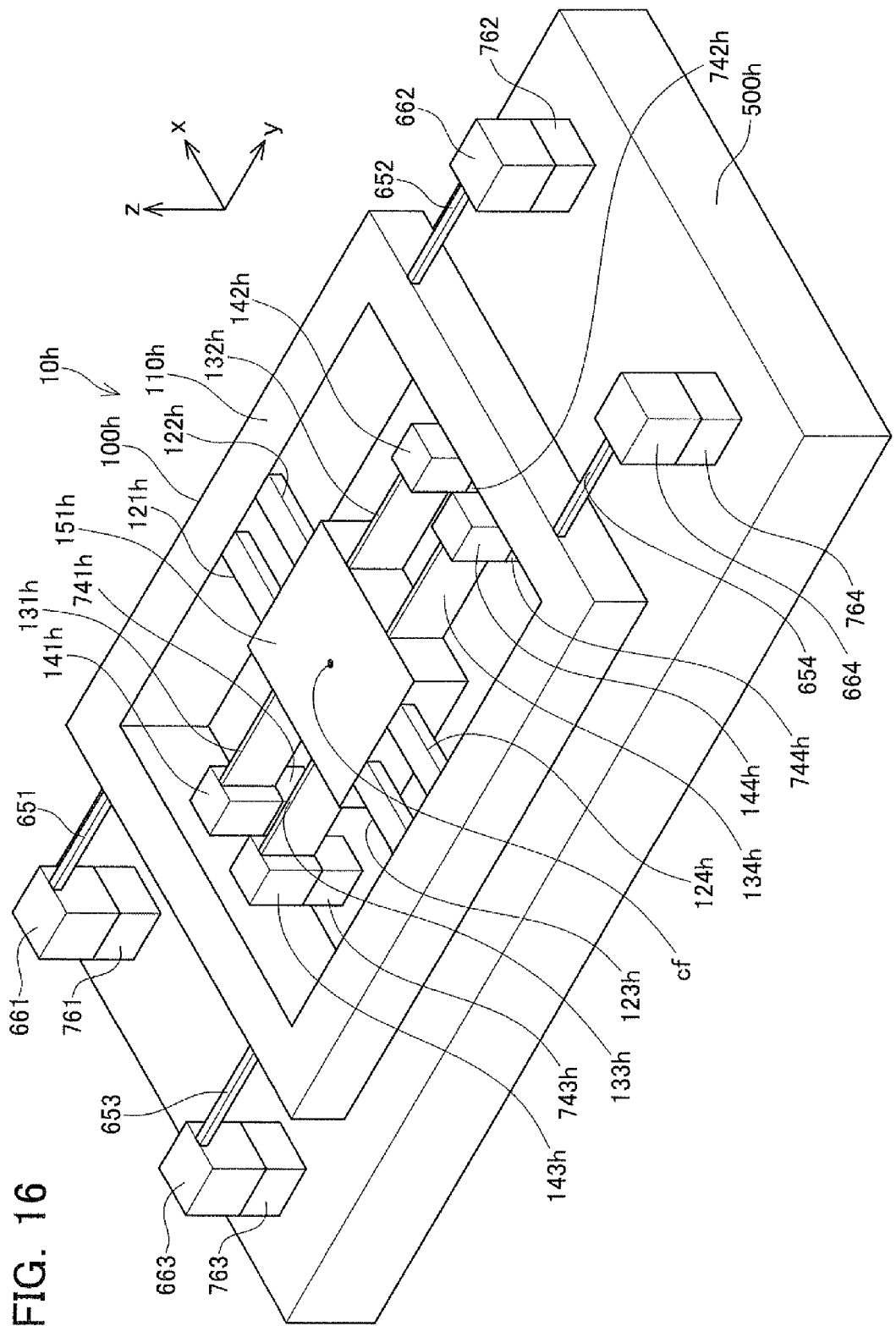
FIG. 16 illustrates schematically a perspective-view diagram of an apparatus having a movable body according to a sixth embodiment.

F. Configuration of an Apparatus Having a Movable Body According to a Sixth Embodiment of the Present Invention:

FIG. 16 illustrates an apparatus 10h comprising a movable body of a sixth embodiment. As shown in FIG. 16, a movable body 100h comprises a joining portion 151h (an example of the first movable portion) and a frame block 110h. The present embodiment differs from the above embodiments in that the joining portion 151h of the present embodiment can move along the x-axis, but not along the y-axis or the z-axis.

The joining portion 151h is placed inside the frame block 110h. The joining portion 151h is connected to four x-axis springs 131h, 132h, 133h, 134h (examples of the first spring portions). The spring constant in the x-axis direction of each x-axis spring is lower than the spring constant thereof in the y-axis and the z-axis directions. The four x-axis springs 131h, 132h, 133h, 134h are connected to the joining portion 151h at positions symmetrical with respect to the x-axis and the y-axis that run through the center Cf of the joining portion 151h. The four x-axis springs 131h, 132h, 133h, 134h are connected to inner fixed portions 141h, 142h, 143h, 144h, respectively. The inner fixed portions 141h, 142h, 143h, 144h are connected to a substrate 500h by way of oxide films 741h, 742h, 743h, 744h. Displacement of the joining portion 151h within the y-z plane is thus constrained.

The frame block 110h is connected to the joining portion 151h by way of four z-axis springs 121h, 122h, 123h, 124h (examples of the second spring portion). The spring constant in the z-axis direction of the z-axis springs 121h, 122h, 123h, 124h is lower than the spring constant thereof in the x-axis and the y-axis directions. The frame block 110h is connected to outer fixed portions 661, 662, 663, 664 by way of four xz-axis springs 651, 652, 653, 654. The spring constants of the xz-axis springs 651, 652, 653, 654 in the x-axis and the z-axis directions are lower than the spring constant thereof in the y-axis direction. The outer fixed portions 661, 662, 663, 664 are connected to the substrate 500h by way of oxide films 761, 762, 763, 764. The frame block 110h, therefore, can move along the x- and z-axes, but not along the y-axis, with respect to the substrate 500h.

The apparatus 10h having the movable body 100h comprises supplementarily an excitation portion that reciprocates the frame block 110h along the z-axis, and a detection unit whose output varies depending on displacements of the joining portion 151h along the x-axis. The angular rate about the y-axis can be measured as a result.

The apparatus 10h having the movable body 100h comprises supplementarily a first detection unit whose output varies depending on the displacement of the joining portion 151h along the x-axis, and a second detection unit whose output varies depending on displacements of the frame block 110h along the z-axis. Acceleration along the x-axis and the z-axis can be measured as a result.

G. Variants:

The specific examples of the present invention explained in detail above are merely illustrative in nature, and are not meant to limit the claims in any way. The features set forth in the claims encompass various alterations and modifications to the specific examples illustrated above. The technical elements explained in the present specification and drawings provide technical value and utility either independently or through various combinations. Also, the present invention is not limited to the combinations set forth in the claims at the time of filing. The purpose of the technology disclosed in the present specification and drawings is to satisfy multiple objectives simultaneously. Herein, satisfying any one of those objectives gives technical value and utility to the present invention. Specifically, for instance, the variants set forth below can also be realized.

G-1: In the above embodiments, a movable body is used for configuring a so-called passive element in the form of an angular rate sensor or an acceleration sensor. Alternatively, it may also be used for configuring an active element in the form of an actuator or an optical switch. The movable body of the present invention, thus, can be used to configure not only passive elements but also active elements.

Figure 17:
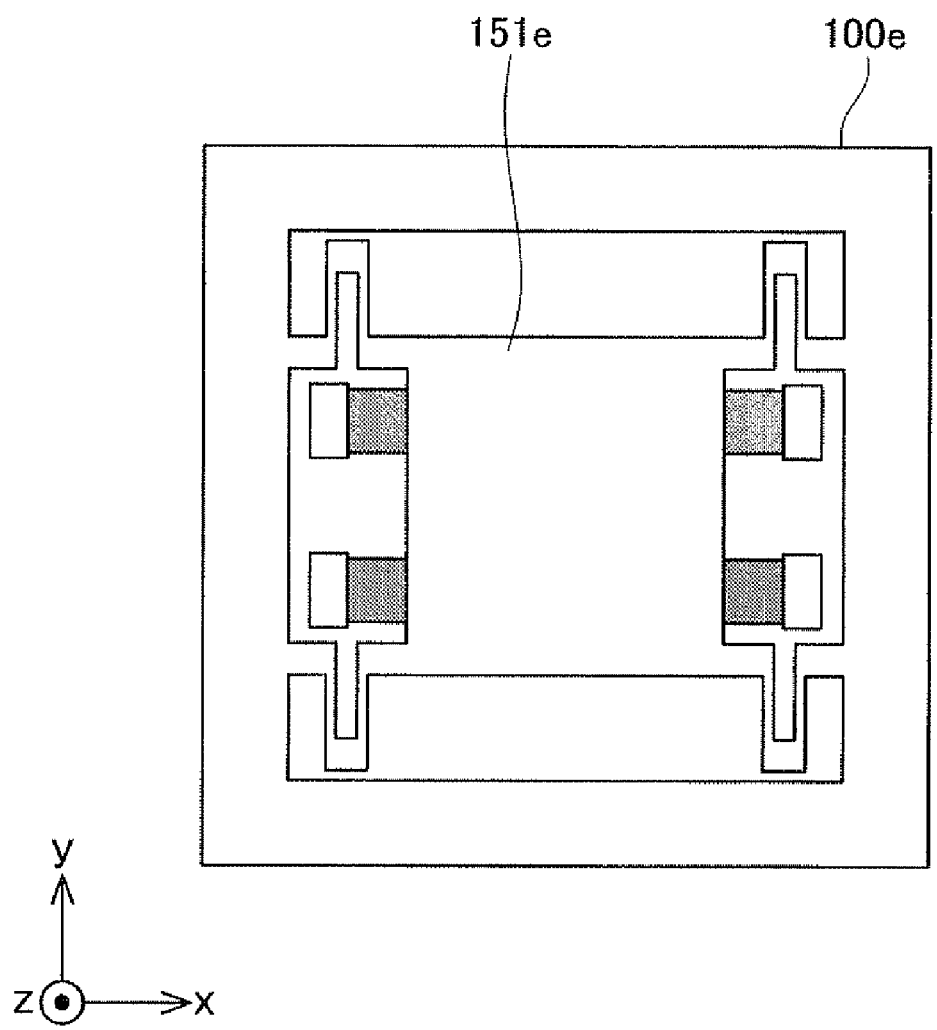
FIG. 17 illustrates a movable body 100e according to a first variant.
Figure 18:
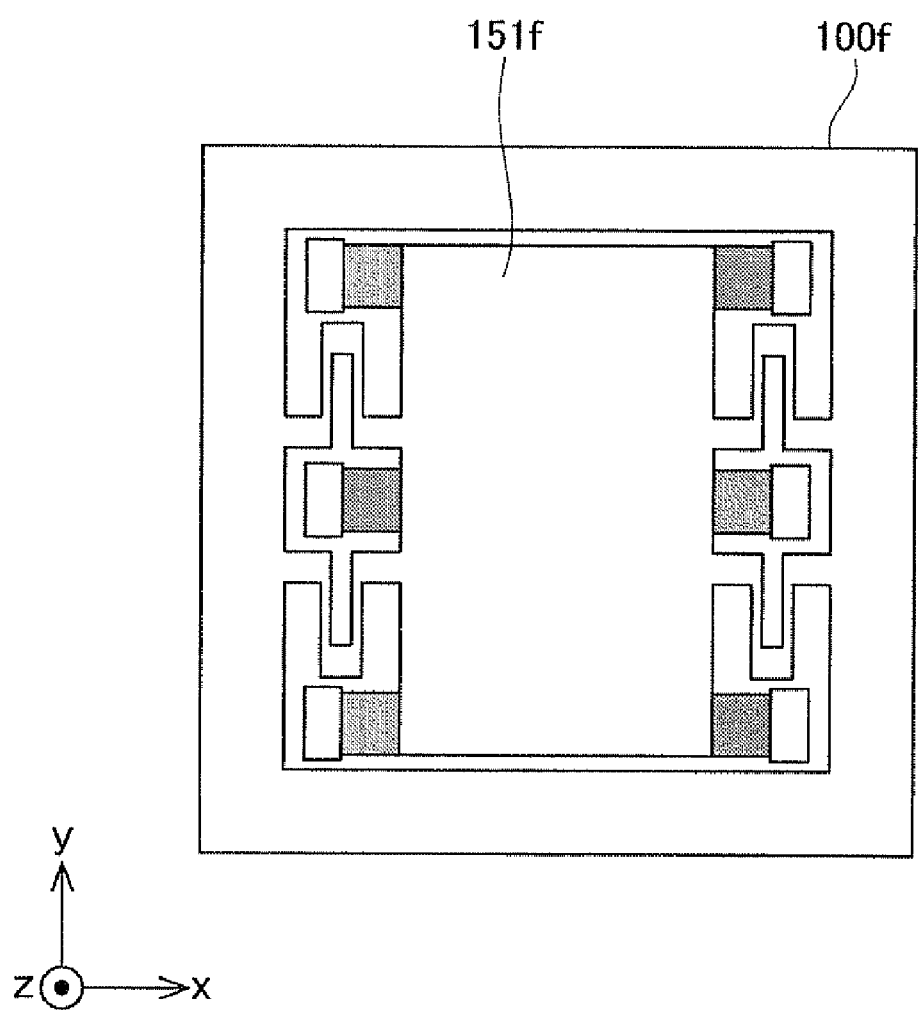
FIG. 18 illustrates a movable body 100f according to a second variant.
Figure 19:
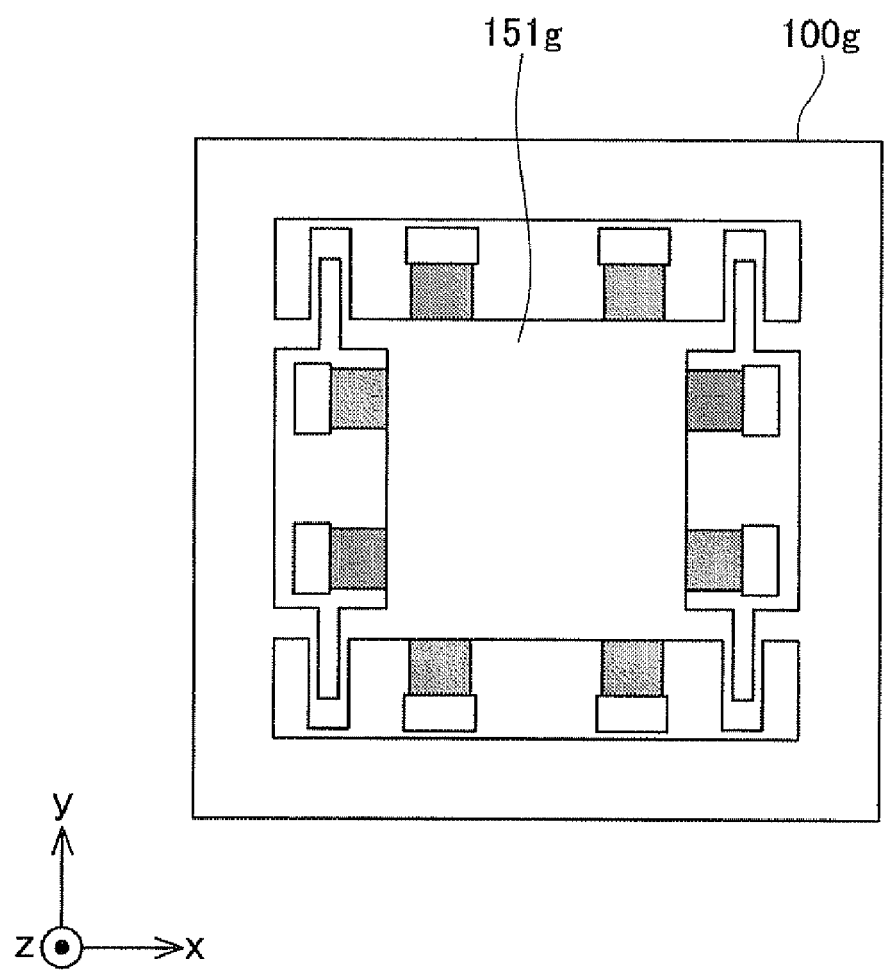
FIG. 19 illustrates a movable body 100g according to a third variant.

G-2: In the above embodiments (except the third embodiment and the variant thereof), an opening for arranging the fixed electrode 230 had been formed. In the first embodiment, for instance, the movable body is described in which the pair of joining portions 151, 152 are separated. In the present invention, however, a movable body 100e of a first variant, a movable body 100f of a second variant or a movable body 100g of a third variant may also be configured as movable bodies in which no opening is formed in a joining portion 151e, 151f, 151g, as illustrated in FIGS. 17 to 19. In this case, the pair of joining portions 151, 152 need not be joined at the inner substrate 530, so that there can be avoided the increase in inertial mass that arises from connection to the inner substrate 530.

Such movable bodies 100e, 100f, 100g enable fixing with higher rigidity, smaller inertial mass, and higher rotational stiffness than those afforded by the configurations of the above embodiments (except the third embodiment and the variant thereof). Providing the opening in the above embodiments (except the third embodiment and the variant thereof), however, is advantageous in that doing so allows arranging the fixed electrode 230, whereby the differential output can be obtained as a result.

What is claimed is:

1. An apparatus having a movable body, the apparatus comprising:
    a first layer comprising a support portion;
    a second layer partially stacked on the first layer; and
    a third layer stacked on the first layer via the second layer, the third layer extending along an x-axis and a y-axis that are perpendicular to each other and perpendicular to a z-axis respectively, wherein
    the third layer comprises a fixed portion fixed to the support portion via the second layer, and a separate portion separated from the support portion,
    the separate portion comprises a plurality of first spring portions connected to the fixed portion, a first movable portion connected to the plurality of first spring portions, a second spring portion connected to the first movable portion, and a second movable portion connected to the second spring portion,
    the second movable portion comprises a rectangular frame having two sides extending along the x-axis and two sides extending along the y-axis,
    the first movable portion is enclosed within the rectangular frame,
    the plurality of first spring portions is distributed at least at four positions between the first movable portion and the second movable portion,
    the four positions are distributed at four symmetric positions about the x-axis and the y-axis that pass through a center of the first movable portion,
    a spring constant of each of the plurality of first spring portions in a z-axis direction is lower than spring constants of each of the plurality of first spring portions in an x-axis direction and a y-axis direction, respectively,
    a spring constant of the second spring portion in the x-axis direction is lower than spring constants of the second spring portion in the y-axis direction and the z-axis direction, respectively,
    the first movable portion is configured, by the plurality of first spring portions, to move along the z-axis but not to move along the x-axis and the y-axis nor to rotate around the z-axis with respect to the support portion, and
    the second movable portion is configured, by the plurality of first spring portions and the second spring portion, to only move along the x-axis and the z-axis with respect to the support portion.

2. The apparatus as in claim 1, wherein
    the plurality of first spring portions is arranged at four positions, and
    the plurality of first spring portions comprises a first group extending along the x-axis and a second group extending along the y-axis.

3. The apparatus as in claim 1, further comprising:
    an oscillator that reciprocates the second movable portion along the x-axis; and
    a displacement detector that changes its output depending on a displacement of the first movable portion along the z-axis.

4. The apparatus as in claim 1, wherein
    the first layer is divided into an inside portion and an outside portion by a groove penetrating the first layer,
    the outside portion forms the support portion,
    the inside portion is configured to move with respect to the outside portion,
    the fixed portion is fixed to the outside portion via the second layer, and
    the first movable portion is fixed to the inside portion via the second layer.

5. The apparatus as in claim 4, wherein the third layer further comprises:
    a detection portion extending from a portion fixed to the outside portion to a portion facing the inside portion via a gap.

6. The apparatus as in claim 1, wherein the third layer further comprises:
    a third spring portion connected to the second movable portion, and
    a second fixed portion connected to the third spring portion and fixed to the support portion via the second layer,
    wherein each of spring constants of the third spring portion in the x-axis and the z-axis directions is lower than a spring constant of the third spring portion in the y-axis direction.

7. The apparatus as in claim 6, wherein
    the third spring portion comprises a movable side spring portion connected to the second movable portion and a fixed side spring portion connected to the second fixed portion,
    a spring constant of the movable side spring portion in the z-axis direction is lower than spring constants of the movable side spring portion in the x-axis and the y-axis directions respectively, and
    a spring constant of the fixed side spring portion in the x-axis direction is lower than spring constants of the fixed side spring portion in the y-axis and the z-axis directions respectively.

8. The apparatus as in claim 7, further comprising:
    a third movable portion arranged between the movable side spring portion and the fixed side spring portion.

9. The apparatus as in claim 8, further comprising:
    an oscillator that reciprocates the third movable portion along the x-axis; and
    a displacement detector that changes its output depending on a displacement of the first movable portion along the z-axis.

10. The apparatus as in claim 8, further comprising:
    a first displacement detector that changes its output depending on a displacement of the first movable portion along the z-axis, and
    a second displacement detector that changes its output depending on a displacement of the third movable portion along the x-axis.

11. The apparatus as in claim 6, wherein
    a plurality of third spring portions is connected to the second movable portion,
    the plurality of third spring portions is distributed at four positions, and the four positions are distributed at four symmetric positions about the x-axis and the y-axis that pass through a center of the first movable portion.

12. The apparatus as in claim 11, wherein
    a plurality of third movable portions is provided at two positions, and the two positions are distributed at symmetric positions about the y-axis that pass through a center of the first movable portion.

13. The apparatus as in claim 1, wherein each of the plurality of first spring portions is connected to each of a plurality of fixed portions distributed at four positions between the first movable portion and the second movable portion, and the four positions are distributed at four symmetric positions about the x-axis and the y-axis that pass through a center of the first movable portion.

14. The apparatus as in claim 1, wherein the first movable portion and the second movable portion are connected by a plurality of second spring portions distributed at four positions between the first movable portion and the second movable portion, and the four positions are distributed at four symmetric positions about the x-axis and the y-axis that pass through a center of the first movable portion.

15. An apparatus having a movable body, the apparatus comprising:
- a first layer comprising a support portion;
- a second layer partially stacked on the first layer; and
- a third layer stacked on the first layer via the second layer, the third layer extending along an x-axis and a y-axis that are perpendicular to each other and perpendicular to a z-axis respectively, wherein the third layer comprises a fixed portion fixed to the support portion via the second layer, and a separate portion separated from the support portion, the separate portion comprises a plurality of first spring portions connected to the fixed portion, a first movable portion connected to the plurality of first spring portions, a second spring portion connected to the first movable portion, and a second movable portion connected to the second spring portion, the second movable portion comprises a rectangular frame having two sides extending along the x-axis and two sides extending along the y-axis, the first movable portion is enclosed within the rectangular frame, the plurality of first spring portions is distributed at least at four positions between the first movable portion and the second movable portion, the four positions are distributed at four symmetric positions about the x-axis and the y-axis that pass through a center of the first movable portion, a spring constant of each of the plurality of first spring portions in an x-axis direction is lower than spring constants of each of the plurality of first spring portions in a y-axis direction and a z-axis direction, respectively, a spring constant of the second spring portion in the z-axis direction is lower than spring constants of the second spring portion in the x-axis direction and the y-axis direction, respectively, the first movable portion is configured, by the plurality of first spring portions, to move along the x-axis but not to move along the y-axis and the z-axis nor to rotate around the z-axis with respect to the support portion, and the second movable portion is configured, by the plurality of first spring portions and the second spring portion, to only move along the x-axis and the z-axis with respect to the support portion.

\* \* \* \* \*